United States Patent
Hessel et al.

(10) Patent No.: US 10,980,198 B2
(45) Date of Patent: *Apr. 20, 2021

(54) AUTOMATED HYDROPONIC GREENHOUSE FACTORY

(71) Applicant: GROWPONICS GREENHOUSE TECHNOLOGY LTD., Kiryat Bialik (IL)

(72) Inventors: Lior Hessel, Kiryat Bialik (IL); Geoffrey Smith, Brentwood (GB)

(73) Assignee: GROWPONICS GREENHOUSE TECHNOLOGY LTD., Kiryat Bialik (IL)

( * ) Notice: Subject to any disclaimer, the term of this patent is extended or adjusted under 35 U.S.C. 154(b) by 317 days.

This patent is subject to a terminal disclaimer.

(21) Appl. No.: 15/817,349

(22) Filed: Nov. 20, 2017

(65) Prior Publication Data

US 2018/0160637 A1 Jun. 14, 2018

Related U.S. Application Data

(63) Continuation of application No. 14/414,121, filed as application No. PCT/IB2013/055378 on Jul. 1, 2013, now Pat. No. 9,848,544.

(Continued)

(51) Int. Cl.
*A01G 31/00* (2018.01)
*A01G 31/02* (2006.01)
(Continued)

(52) U.S. Cl.
CPC ............. *A01G 31/02* (2013.01); *A01G 13/02* (2013.01); *A01G 22/00* (2018.02); *A01G 31/00* (2013.01)

(58) Field of Classification Search
CPC ................................ A01G 31/00; A01G 31/02
(Continued)

(56) References Cited

U.S. PATENT DOCUMENTS 2,531,562 A * 11/1950 Eve ..................... A01G 9/028
47/80
3,927,491 A * 12/1975 Farnsworth ............ A01G 31/02
47/63
(Continued)

FOREIGN PATENT DOCUMENTS

CN 87201208 U 1/1988
CN 102422786 A 4/2012
(Continued)

OTHER PUBLICATIONS

Liu Wenxi et al. "Plant Factory Hardening Seedling System and its Equipment", Dec. 31, 2011, p. 183-189. article and accompanying English Translation.

*Primary Examiner* — David J Parsley
(74) *Attorney, Agent, or Firm* — Mark M. Friedman

(57) ABSTRACT

Plants are grown in adjacent rows of trays that are rotated within a pool of a nutrient solution. The roots of the plants are at least partly immersed in the nutrient solution. Each row includes a gap wide enough to receive a single tray from an adjacent row. Using three rows, the plants are planted only in one of the rows, and later the rotation is used to space the planted trays one tray apart. Each tray is a parallelepipedal block with apertures for supporting respective plants. The long sides of the blocks have protrusions for preventing adhesion of the blocks. Airlift pumping circulates the nutrient solution past the roots and maintains at least 80% dissolved oxygen saturation in the nutrient solution. A screen of parallel inflatable tubes provides adjustable shade above the pool.

13 Claims, 21 Drawing Sheets

Related U.S. Application Data

(60) Provisional application No. 61/670,147, filed on Jul. 11, 2012.

(51) Int. Cl.
*A01G 13/02* (2006.01)
*A01G 22/00* (2018.01)

(58) Field of Classification Search
USPC .......................................... 47/60, 62 C, 62 R
See application file for complete search history.

(56) References Cited

U.S. PATENT DOCUMENTS

| | | | |
|---|---|---|---|
| 4,037,360 A | 7/1977 | Farnsworth | |
| 4,041,641 A | 8/1977 | Dietz | |
| 4,253,271 A | 3/1981 | Raymond | |
| 4,290,229 A | 9/1981 | Miura | |
| 4,312,152 A | 1/1982 | Drury et al. | |
| 4,355,484 A | 10/1982 | Mandish | |
| 4,382,348 A | 5/1983 | Kitsu et al. | |
| 4,536,988 A | 8/1985 | Hogen | |
| 4,607,454 A | 8/1986 | Koike | |
| 5,056,260 A * | 10/1991 | Sutton | A01G 7/00 47/58.1 R |
| 5,261,185 A | 11/1993 | Koide | |
| 5,528,856 A | 6/1996 | Smith et al. | |
| 6,243,987 B1 | 6/2001 | Hessel | |
| 6,508,033 B2 | 1/2003 | Hessel et al. | |
| 6,751,903 B2 | 6/2004 | Shryock | |
| 6,843,021 B1 | 1/2005 | Huang | |
| 7,448,163 B2 | 11/2008 | Beeman | |
| 7,784,218 B2 | 8/2010 | Kania et al. | |
| 8,245,440 B2 | 8/2012 | Ryan et al. | |
| 8,443,749 B2 | 5/2013 | Kania et al. | |
| 2003/0049392 A1 | 3/2003 | Shryock | |
| 2006/0201058 A1 | 9/2006 | Ripatti | |
| 2007/0137100 A1 | 6/2007 | Beeman | |
| 2010/0088956 A1 | 4/2010 | Kania et al. | |
| 2011/0023360 A1 | 2/2011 | Ryan et al. | |
| 2011/0131876 A1 | 6/2011 | Pettibone | |
| 2012/0050449 A1 | 3/2012 | Iwase et al. | |
| 2012/0211821 A1 | 8/2012 | Matsumoto | |

FOREIGN PATENT DOCUMENTS

| | | |
|---|---|---|
| JP | 45007937 B | 3/1970 |
| JP | 51-135225 | 11/1976 |
| JP | 62-195226 A | 8/1987 |
| JP | 3-16853 U | 2/1991 |
| JP | 175666 | 2/1991 |
| JP | 08047348 A | 2/1996 |
| JP | 2000106776 A | 4/2000 |
| JP | 2007061002 A | 3/2007 |
| JP | 2008271883 A | 11/2008 |
| JP | 2011083230 A | 4/2011 |
| WO | 8707816 A | 12/1987 |
| WO | 03041489 A1 | 5/2003 |
| WO | 2011058201 A1 | 5/2011 |
| WO | 2012050440 A1 | 4/2012 |
| WO | 2014009842 A3 | 3/2014 |

\* cited by examiner

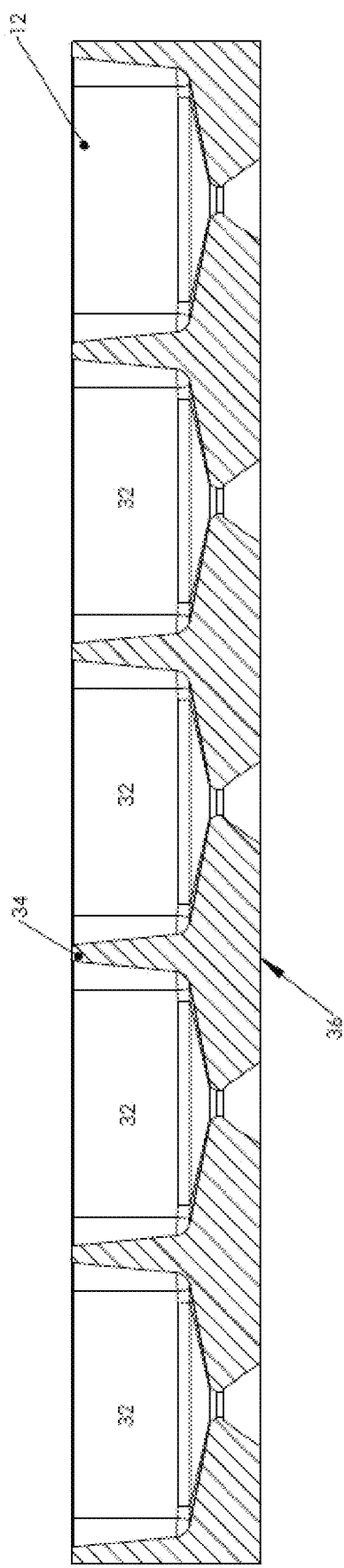
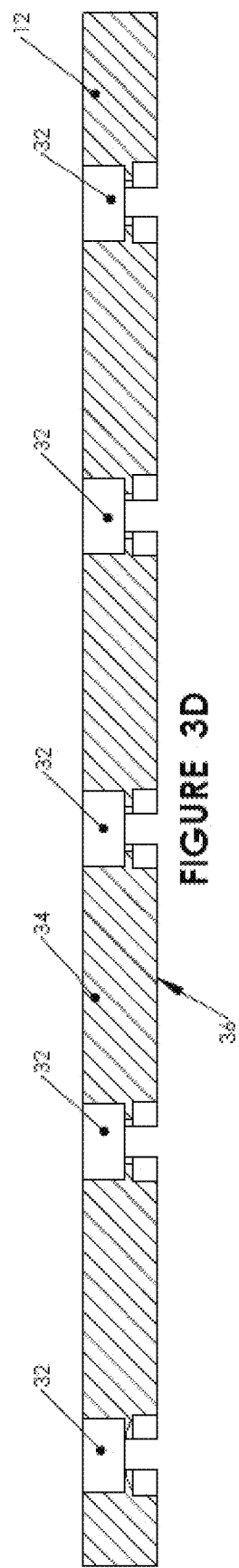

AUTOMATED HYDROPONIC GREENHOUSE FACTORY

CROSS REFERENCES TO RELATED APPLICATIONS

This patent application is a Continuation Patent Application of commonly owned U.S. patent application Ser. No. 14/414,121, entitled: AUTOMATED HYDROPONIC GREENHOUSE FACTORY, filed on Jul. 1, 2013, now U.S. Pat. No. 9,848,544, which is a § 371 of commonly owned PCT Application PCT/IB2013/055378, entitled: AUTOMATED HYDROPONIC GREENHOUSE FACTORY, filed Jul. 1, 2013 (§ 371 date of Jan. 12, 2015), which claims priority from commonly owned U. S. Provisional Patent Application No. 61/670,147, filed Jul. 11, 2012, all of the aforementioned patent applications incorporated by reference in their entirety herein.

FIELD AND BACKGROUND OF THE INVENTION

The present invention relates to hydroponics and, more particularly, to innovative automated hydroponic systems and methods for raising commercially valuable plants.

Traditionally, fruit and vegetables have been grown where and when the climate allows. In recent decades massive quantities of produce have been shipped, thousands of miles, from the growing areas to the consumers' concentrations. The rising prices of energy and water have made fresh produce prices go up continuously due to the growing cost of transportation and the lack of water in the growing areas. It is for these reasons, among others, that there is a growing demand for local production. To satisfy this growing demand for local production of vegetables, protected crops technology and techniques and greenhouse enclosures are needed. Growing crops indoors in order to protect them from the ambient conditions that are not suitable for their growth is very expensive. Both the amortization of the building, and the running cost of maintaining the suitable conditions inside, are costs that are relative to the area of the building. Hydroponics is a preferred method of growing indoors because it is a cost effective growing method. Adding automation to hydroponics creates an optimal solution for high yields per area.

SUMMARY OF THE INVENTION

The fast growth of plants when grown in systems of the present invention according to methods of the present invention, combined with the reduction of walkway area provided by the present invention, combined with spacing of the plants as they grow, as provided by the present invention, gives maximum yields per building area thus making the building in which the plants are grown cost efficient.

According to the present invention there is provided an apparatus for growing plants, including: (a) a pool for a nutrient solution; (b) a sufficient number of substantially identical trays, for at least partial immersion in the nutrient solution, to be arranged in a plurality of rows within the pool such that each row includes at least one the tray and also includes a gap wide enough to receive one and only one of the trays from an adjacent the row, each tray being adapted to hold at least one of the plants so that roots of the at least one plant are at least partly immersed in the nutrient solution; (c) for each row, a mechanism for moving the at least one tray of the each row within the each row, thereby changing a location of the gap within the row relative to the at least one tray of the row; and (d) a mechanism for moving one of the at least one tray of each row into the gap of an adjacent the row.

According to the present invention there is provided a method of growing plants, including the steps of: (a) arranging, in a pool of a nutrient solution, a sufficient number of substantially identical trays to be arranged in three rows within the pool such that each row includes a plurality of the trays and also includes a gap wide enough to receive one and only one of the trays from an adjacent the row, each tray being adapted to hold at least one of the plants so that roots of the at least one plant are at least partly immersed in the nutrient solution; (b) planting at least one of the plants in each of the trays of only one of the rows, leaving the trays of the other rows as empty trays, thereby transforming the trays of the only one row into planted trays; and (c) exchanging the trays among the rows, only within the pool, so that the planted trays are located only in the other rows, with every tray that is adjacent to a planted tray being one of the empty trays.

According to the present invention there is provided a tray, for supporting at least one plant with roots thereof at least partly immersed in a nutrient solution, including a substantially parallelepipedal block having, for each plant, an aperture that extends from a top side of the tray to a bottom side of the tray, and having, on each long side thereof, at least one protrusion for preventing adhesion of the tray to an adjacent tray when the tray and the adjacent tray are at least partly immersed in the nutrient solution.

According to the present invention there is provided a method of growing a plant, including the steps of (a) suspending the plant so that roots of the plant are at least partly immersed in a nutrient solution having a depth of between about 4 centimeters and about 20 centimeters; and (b) causing the nutrient solution to flow past the roots.

According to the present invention there is provided a method of growing a plant, including the steps of: (a) suspending the plant so that the roots of the plant are at least partly immersed in a nutrient solution; and (b) using airlift pumping to cause the nutrient solution to flow past the roots.

According to the present invention there is provided a device for growing a plant, including: (a) a mechanism for suspending the plant so that the roots of the plant are at least partly immersed in a nutrient solution; and (b) an airlift pump for causing the nutrient solution to flow past the roots.

According to the present invention there is provided a method of growing a plant, including the steps of: (a) suspending the plant so that the roots of the plant are at least partly immersed in a nutrient solution; and (b) maintaining a concentration of dissolved oxygen in the nutrient solution at least about 80% of saturation.

According to the present invention there is provided a device for growing a plant, including: (a) a mechanism for suspending the plant so that the roots of the plant are at least partly immersed in a nutrient solution; and (b) a mechanism for maintaining a concentration of dissolved oxygen in the nutrient solution at at least about 80% of saturation.

According to the present invention there is provided a system for growing plants including: (a) a plurality of hydroponic units; and (b) a single manifold for sampling a respective nutrient solution of each unit, thereby providing a sample of the respective nutrient solution; and (c) a controller for: (i) measuring at least one property of each sample, and (ii) in response to the measuring, and via the manifold, adjusting the respective nutrient solution of which the each sample is a sample.

According to the present invention there is provided a device for providing adjustable shade, including: (a) a plurality of parallel linear support members; (b) substantially enclosing each support member: a flexible tube; and (c) an inflation mechanism for reversibly inflating each tube.

According to the present invention there is provided a system for growing and harvesting plants, including: (a) a bed, for growing the plants, that includes a mechanism for moving the plants to a side of the bed when the plants are ready for harvesting; and (b) a harvester, adapted to be positioned adjacent to the side of the bed, for harvesting the plants as the plants are moved by the mechanism to the side of the bed.

According to the present invention there is provided a method of growing and harvesting plants, including: (a) placing the plants in a bed wherein the plants grow until ready to be harvested; and (b) moving the plants within the bed to a side of the bed while using a mechanical harvester at the side of the bed to harvest the plants.

According to the present invention there is provided a system for growing a plurality of plants, including: (a) a plurality of substantially parallel troughs for supporting a nutrient solution; (b) an opaque flexible sheet having a plurality of apertures therein for supporting the plants; and (c) a roller for reversibly unrolling the flexible sheet parallel to the troughs and positioned relative to the troughs so that when the flexible sheet is unrolled the flexible sheet substantially covers at least a portion of the plurality of troughs, with each aperture above a respective the trough and sufficiently close to the trough that roots of a plant that is supported by the each aperture are at least partly immersed in the nutrient solution.

According to the present invention there is provided a method of growing a plurality of plants, including the steps of: (a) placing a nutrient solution in a plurality of substantially parallel troughs; (b) spreading a flexible opaque sheet, that includes a plurality of apertures for supporting the plants, above at least a portion of the troughs so that each aperture is above a respective the trough; and (c) inserting each of the plants in a respective one of the apertures so that the one plant is supported by the respective aperture with roots of the one plant at least partly immersed in the nutrient solution.

A first aspect of the present invention is a rotating field system for growing plants. A basic apparatus of the first aspect includes a pool for a nutrient system, a plurality of substantially identical trays to be at least partially immersed in the pool, and mechanisms for moving the trays within the pool. There are enough trays to be arranged in a plurality of rows within the pool such that each row includes at least one tray and also includes a gap wide enough to receive exactly one tray from an adjacent row. Each tray is adapted to hold at least one of the plants so that the roots of the plant(s) are at least partly immersed in the nutrient solution. For each row there is a mechanism for moving the tray(s) of the row within the row to change the location of the gap within the row relative to the tray(s) of the row. The apparatus also includes a mechanism for moving one of the tray(s) of each row into the gap of an adjacent row.

Preferably, the apparatus includes enough trays for each row to include two or more trays.

Preferably, each tray is adapted to float in the nutrient solution. (Alternatively, but less preferably, the trays could be supported in the pool on wheels or rollers.)

Preferably, the mechanism for moving the trays of a row within that row moves the trays in only one direction within that row. Most preferably, these mechanisms are arranged to move the trays of adjacent rows in opposite directions.

Preferably, the tray that is moved from a row into the gap of an adjacent row is an end tray of the row from which the tray is moved.

Preferably, the apparatus includes at least three rows of trays, arranged so that at least one of the rows is between two other rows. The mechanism for moving trays between rows is operative to move trays of the at least one row to either or the two other rows.

Preferably, the apparatus also includes a harvester that is adapted to be positioned to an end of one of the rows, for harvesting the plant(s) that is/are held by the tray at that end of the row.

In a basic method of the first aspect of the present invention, substantially identical trays are arranged in a pool of a nutrient solution. There are enough trays to be arranged in three rows within the pool, with each row including two or more trays and a gap wide enough to receive exactly one tray from an adjacent row. Each tray is adapted to hold one or more of the plants so that the roots of the plant(s) are at least partly immersed in the nutrient solution. One or more of the plants is/are planted in each tray of only one of the three rows, leaving the trays of the other rows as empty trays (i.e., trays that are empty of the plants), thereby transforming the trays of that one row into planted trays. The trays then are exchanged among the rows, only within the pool, so that the planted trays are located only in the two other rows, with every tray that is adjacent to a planted tray being an empty tray.

Preferably, when the plants are planted in the trays of the only one row, the plants are sufficiently small to thrive despite being planted in adjacent trays. The trays are exchanged after the plants have grown sufficiently to require spacing apart of the adjacent trays in order for the plants to continue to thrive.

Preferably, the exchanging of the trays is effected by steps including moving one of the trays of one of the rows into the gap of an adjacent row.

Preferably, the exchanging results in the only one row being occupied only by empty trays. Then, one or more or the plants again are planted in each tray of the only one row.

The trays of the first aspect of the present invention are themselves the second aspect of the present invention. A basic tray, for supporting one or more plants with the roots of the plant(s) at least partly immersed in a nutrient solution, includes a substantially parallelepipedal block that has two parallel long sides, two parallel short sides, a top side and a bottom side, and that also has, for each plant, an aperture that extends from the top side of the tray to the bottom side of the tray. Each long side of the block has one or more protrusions for preventing adhesion of the tray to an adjacent tray when the two trays are at least partly immersed in the nutrient solution.

Preferably, the block is made of a material, such as low-density polypropylene, whose density is such that the block floats in the nutrient solution.

Preferably, the tray includes a champfer at each lateral edge. (The lateral edges are the edges where the long and short sides meet.) Most preferably, each champfer is at an angle of between about 15° and about 25° relative to an adjacent side of the tray.

Preferably, the aperture(s) is/are arranged to support the plant(s), for example by the leaves of the plant(s) or by the roots of the plant(s).

A third aspect of the present invention is a method for growing a plant. According to the method, the plant is suspended so that the roots of the plant are at least partly immersed in a nutrient solution that is between about 4 centimeters and about 20 centimeters deep and that preferably includes dissolved oxygen at a saturation level of at least about 80%. The nutrient solution is caused to flow past the roots.

Preferably, the nutrient solution is between about 5 centimeters and about 6 centimeters deep.

Preferably, airlift pumping is used to cause the nutrient solution to flow past the roots. Most preferably, the airlift pumping is effected at a sufficiently high flow rate to achieve at least about 80% dissolved oxygen saturation of the nutrient solution.

A fourth aspect of the present invention is a method and device for growing a plant. According to the method, the plant is suspended so that the roots of the plant are at least partly immersed in a nutrient solution. Airlift pumping is used to cause the nutrient solution to flow past the roots. The device includes a mechanism for suspending the plant so that the roots of the plant are at least partly immersed in a nutrient solution and an airlift pump for causing the nutrient solution to flow past the roots.

A fifth aspect of the present invention is a method and device for growing a plant. According to the method, the plant is suspended so that the roots of the plant are at least partly immersed in a nutrient solution. The concentration of dissolved oxygen in the nutrient solution is maintained at at least about 80% of saturation The device includes a mechanism for suspending the plant so that the roots of the plant are at least partly immersed in a nutrient solution and a mechanism for maintaining the concentration of dissolved oxygen in the nutrient solution at at least about 80% of saturation.

A sixth aspect of the present invention is a system for growing plants. A basic such system includes a plurality of hydroponic units, a single manifold for sampling a respective nutrient solution of each unit to provide a sample of each nutrient solution, and a controller for measuring at least one property, such as acidity, electrical conductivity or dissolved oxygen concentration, of each of the samples and, in response to the measuring, and via the manifold, adjusting the corresponding nutrient solution.

Preferably, the system also includes a mechanism for adjusting the temperature of each nutrient solution. The controller is operative to measure the temperatures of the samples and, in response to the measuring, and via the temperature adjusting mechanism, to adjust the temperatures of the corresponding nutrient solutions.

A seventh aspect of the present invention is a device for providing adjustable shade. A basic such device includes a plurality of linear support members, such as the support wires of FIGS. 9A and 9B below. The device also include, for each support member, a flexible tube that substantially encloses that support member. The device also includes an inflation mechanism for reversibly inflating each tube.

Preferably, the tubes are opaque. Alternatively, the tubes are transparent, and the device also includes a reservoir, of a colloidal suspension of particles in a gas such as air, that is operatively associated with the inflation mechanism The colloidal particles are for modifying an optical property of the tubes.

Preferably, the device also includes, for each tube, a weight for holding the tube in a substantially straight vertical orientation when the tube is uninflated.

An eighth aspect of the present invention is a system and method for growing and harvesting plants. The plants are placed for growing in a bed that includes a mechanism for moving the plants to a side of the bed when the plants are ready for harvesting. When the plants are ready for harvesting, the mechanism moves the plants to that side of the bed, where a mechanical harvester is used to harvest the plants. That the harvester is "mechanical", here and in the first and ninth aspects of the present invention, excludes from the scope of the related attached claims a person who stands at the side of the bed and harvests the plants.

A ninth aspect of the present invention is a nutrient film technique system and method for growing a plurality of plants. A basic system of the eight aspect includes a plurality of substantially parallel troughs for supporting a nutrient solution, an opaque flexible sheet that has a plurality of apertures for supporting the plants, and a roller for reversibly unrolling the flexible sheet parallel to the troughs. The roller is positioned relative to the troughs so that when the flexible sheet is unrolled the flexible sheet substantially covers at least a portion of the troughs, with each aperture above a respective trough and sufficiently close to the trough that the roots of a plant that is supported by that aperture are at least pertly immersed in the nutrient solution.

Preferably, the troughs are corrugations of a substantially rigid sheet such as a polymer-coated metal sheet.

Preferably, the system also includes a harvester that is adapted to be positioned adjacent to the roller. The harvester is for harvesting the plants that are supported by the apertures as the flexible sheet is rolled off of the troughs onto the roller.

In a basic method of the eighth aspect of the present invention, a nutrient solution is placed in a plurality of substantially parallel troughs. A flexible opaque sheet, that includes a plurality of apertures, is spread above at least a portion of the troughs so that each aperture is above a respective trough. Each plant is inserted in a respective trough so that the plant is supported by its aperture with its roots at least partly immersed in the nutrient solution.

Preferably, for harvesting, the sheet is withdrawn from above the troughs in a direction substantially parallel to the troughs while withdrawing at least a portion of each plant from its aperture when the plant reaches an end of the trough in which the plant's roots have been at least partly immersed in the nutrient solution.

BRIEF DESCRIPTION OF THE DRAWINGS

Various embodiments are herein described, by way of example only, with reference to the accompanying drawings, wherein:

FIGS. 3A-3D illustrate preferred embodiments of a tray of the preceding FIGS.;

DESCRIPTION OF THE PREFERRED EMBODIMENTS

The principles and operation of hydroponics according to the present invention may be better understood with reference to the drawings and the accompanying description.

Rotating Field System

The motivation for the basic rotating field system of the present invention is to create a conveyor system and mechanism to automatically rotate trays that bear plants in a growing bed in order to enable, planting, spacing, inspecting, treating and harvesting at the end or ends of the bed, thus eliminating the need for walkways between the beds.

Figure 1A:
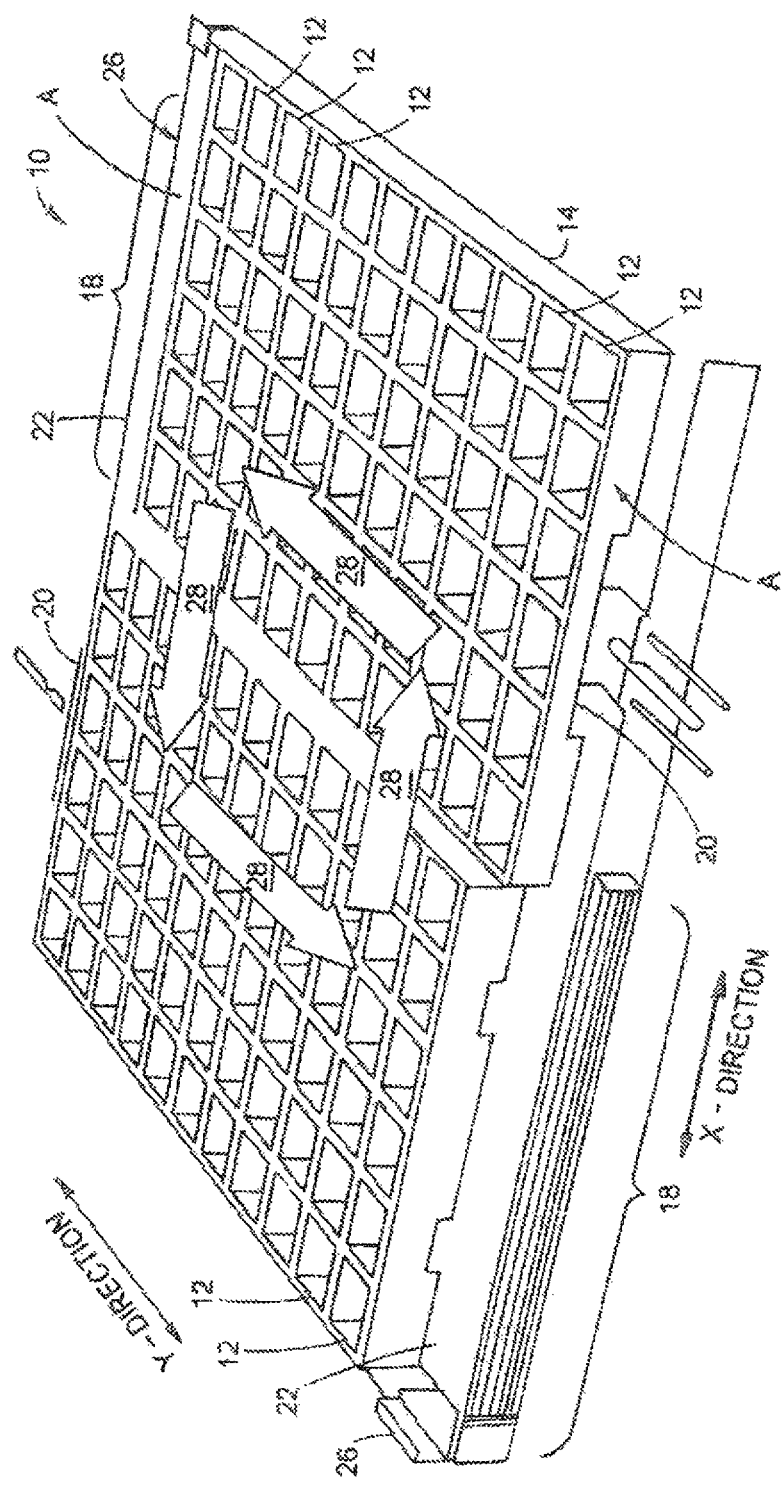
FIGS. 1A-1C illustrate a basic rotating field system of the present invention with two rows of trays.
Figure 1B:
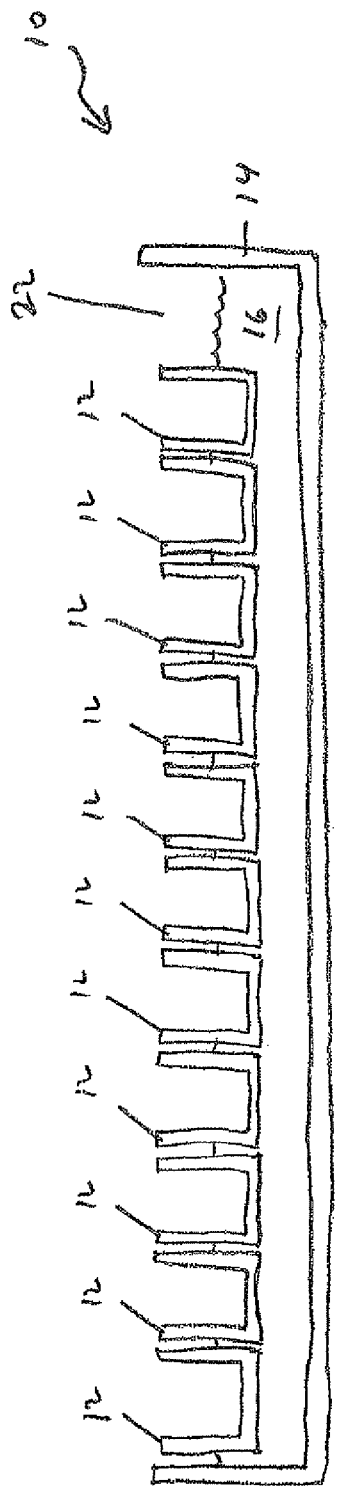
Figure 1C:
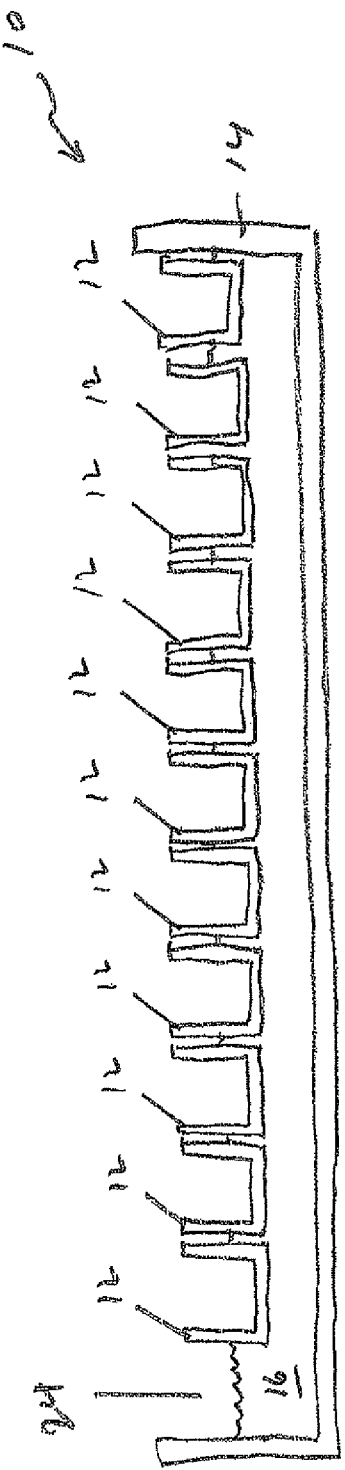

Referring now to the drawings, FIGS. 1A-1C illustrate the basic components of a basic rotating field system 10 of the present invention. FIG. 1A is a perspective view of system 10. FIGS. 1B and 1C are cross-sectional views of system 10 along cut A-A. System 10 is arranged so that trays 12 are rotated automatically, inside a water bed 14 (which is an example of the "pool" recited in the appended claims) as trays 12 float on a nutrient solution 16 in bed 14. The use of such flotation allows a reliable, low maintenance, cost efficient solution and eliminates the need for use of beatings, shafts, sliding mechanisms and other mechanical fixtures for causing linear motion of trays 12. Bed 14 includes a separation barrier (not shown) that allows for two rows 18 of trays 12, one row 18 on each side of the barrier. Two pneumatic pistons 20 (Y-pistons) push respective rows 18 of trays 12 in opposite Y-directions. Prior to movement of a row 18 by Y-piston 20 of that row 18, that row 18 includes a gap 22 where one tray 12 is missing. This situation is illustrated in FIG. 1B for the right-side row 18 of FIG. 1A. As a row 18 is pushed by its Y-piston 20, the last tray 12, that is nearest to that Y-piston 20, is retained by a spring arm (not shown) that prevents that tray 12, and the rest of trays 12 in that row 18, from moving back as that Y-piston 20 retracts back, leaving a vacant tray-sized gap 24 adjacent to Y-piston 20, as illustrated in FIG. 1C. Two other pneumatic pistons 26 (X-Pistons) then push the first tray 12 in each row 18 into the vacant gaps 24, causing that tray 12 to join the other row 18 of trays 12. And then the two Y-pistons 20 again push rows 18 of trays 12 in the Y-direction, one row 18 in the opposite direction of the other row 18. Arrows 28 show the way trays 12 are thus rotated within bed 14. This procedure is governed, controlled, timed and synchronized by a controller (see FIG. 8) and can be started and stopped by the operator by pushing a switch.

FIGS. 2A-2L illustrate an enhanced rotating field system 30 that uses system 10 as its basic building block. The motivation for system 30 is to do the spacing of the plants automatically. Plants takes significantly less growing area as they build their biomass in their young growing stage, and thus need more growing area in their later growing stage. In order to utilize the growing area better, and increase the yields per square meter, plants are spaced differently during stages of their growth cycle.

While system 10 automatically rotates trays 12 that carry the plants within bed 14, trays 12 never leave the single bed 14 and are only rotated within bed 14. The spacing can only be done manually, at one of the ends of bed 14, during the rotation. System 30 automatically, preferably using the same pneumatic pistons 20 and 26, both rotates trays 18 within a single bed as needed and moves trays 18 between neighboring beds in order to space the plants by inserting an empty tray 18 from a neighboring bed in-between trays 18 whose plants need spacing.

Figure 2A:
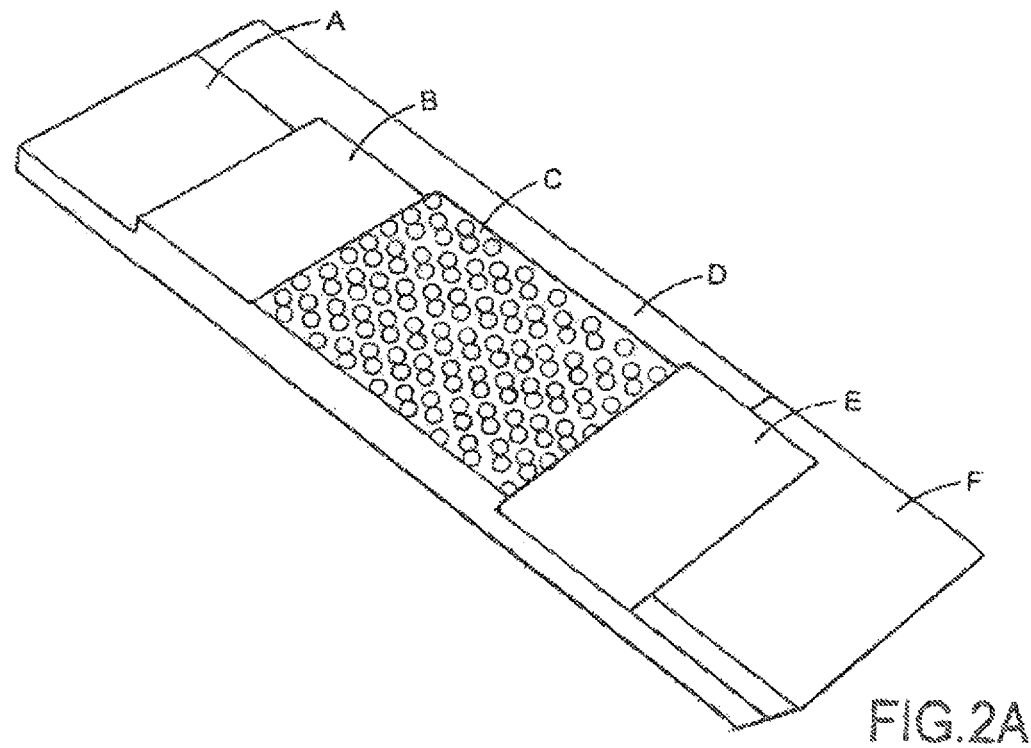
FIGS. 2A-2L illustrate how trays are rotated within a rotating field system with six rows of trays to insert empty trays between planted trays as needed.

FIGS. 2A-2L show a growing and harvesting cycle in six adjacent beds (each with its own single row 18 of trays 12) of a water unit 14 (which also is an example of the "pool" recited in the appended claims). The beds are labeled A-F from upper left to lower right. FIG. 2A shows beds C and D fully occupied by trays 12 planted with immature plants. Trays 12 of beds A, B, E and F are empty. Beds A, B, E and F are ready to receive trays 12 from beds C and D and to space those trays 12 for further growth of the plants.

Figure 2B:
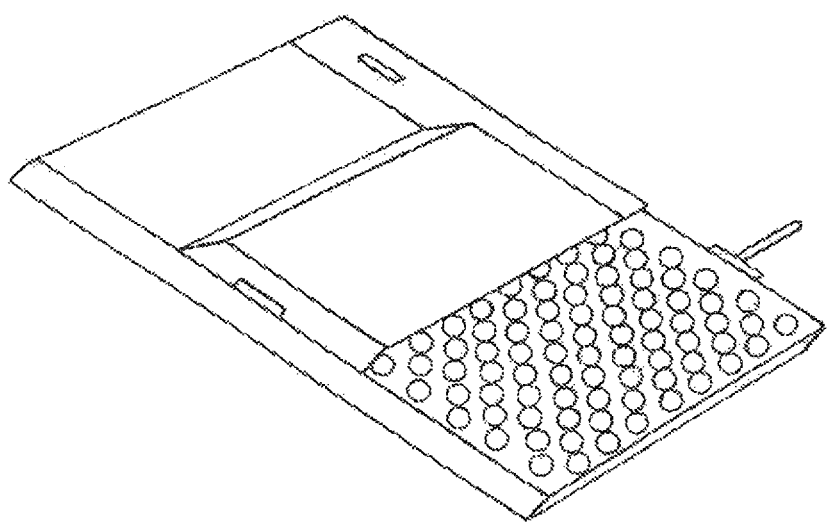

FIG. 2B shows the plants of bed C sufficiently mature to be moved to beds A and B for further growth.

Figure 2C:
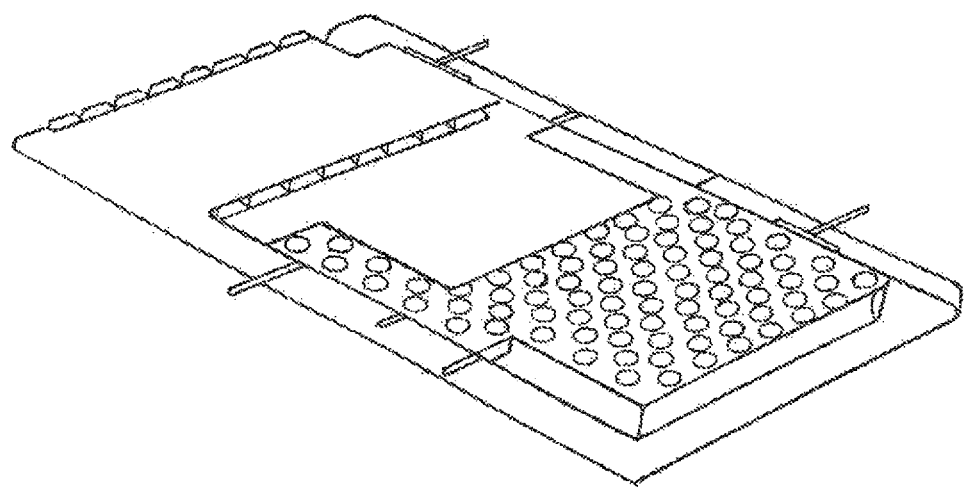

FIG. 2C shows a planted tray 12 being moved from bed C to bed B while an empty tray 12 is moved from bed B to bed A.

Figure 2D:
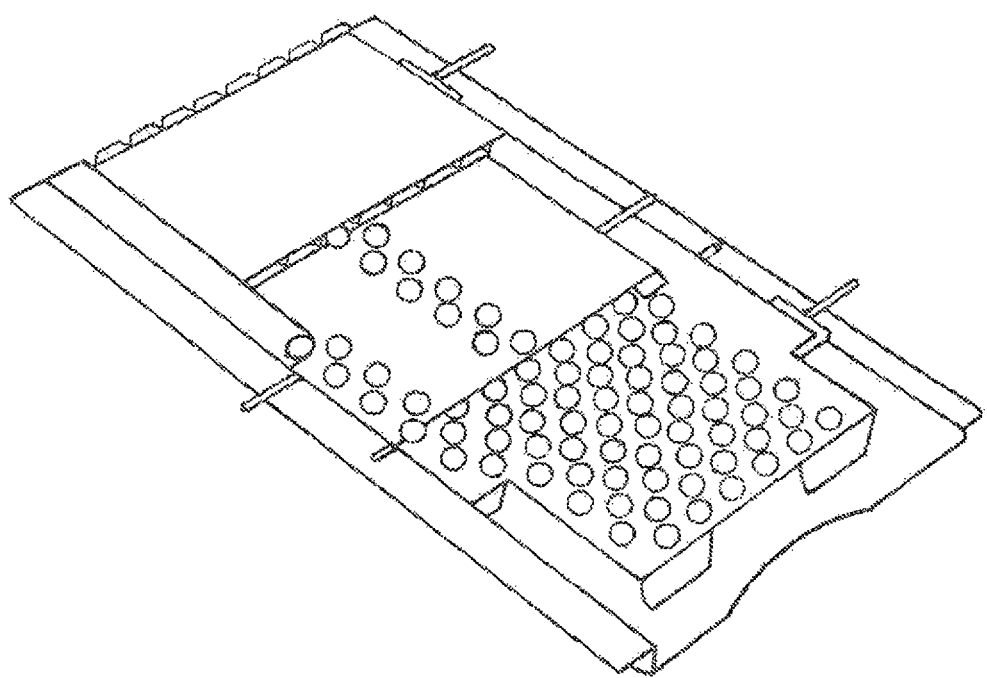

Between the situations illustrated in FIGS. 2C and 2D, an empty tray 12 is moved from bed B to bed C and beds A and B are rotated, to put two empty trays 12 behind the planted tray 12 in bed B.

FIG. 2D shows a second tray 12 being moved from bed C to bed B while an empty tray 12 is moved from bed B to bed C. Note the two empty trays 12 in bed B between the two planted trays 12.

Between the situations illustrated in FIGS. 2D and 2E, again, an empty tray 12 is moved from bed B to bed C and beds A and B are rotated to put two empty trays 12 behind the second planted tray 12 in bed B.

Figure 2E:
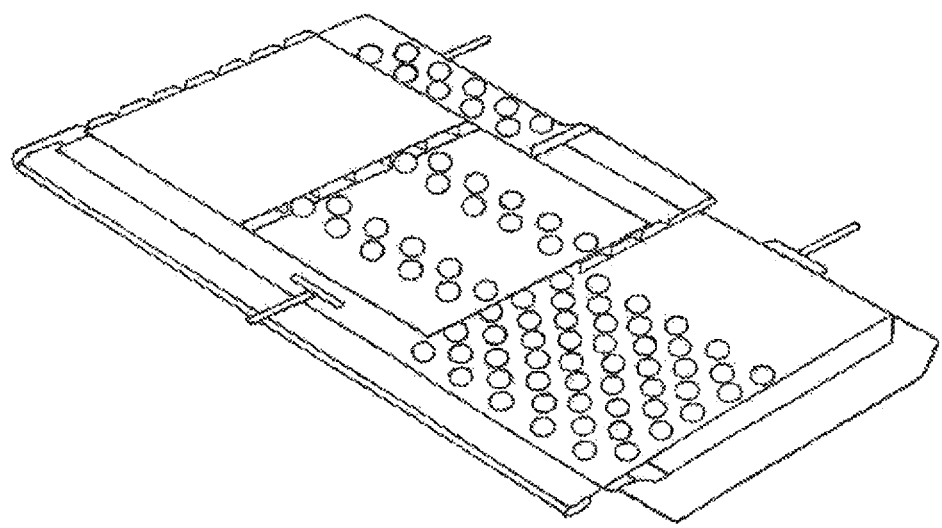

FIG. 2E shows the situation after three planted trays 12 have been moved out of bed C. The first tray 12 that was moved out of bed C is being moved from bed B to bed A. The second and third trays 12 that were moved from bed C are in bed B. All three trays 12 that have been moved from bed C have been replaced in bed C by empty trays 12.

Figure 2F:
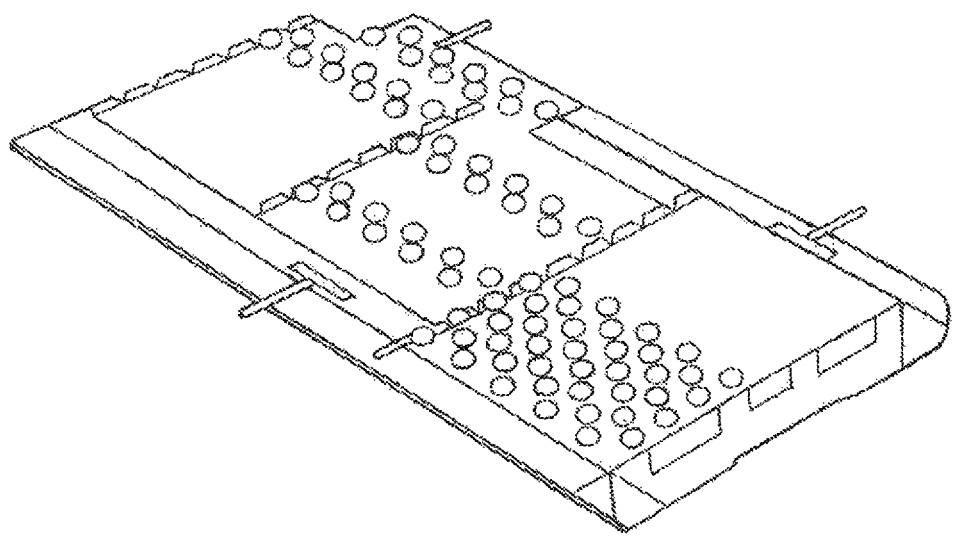

Between the situations illustrated in FIGS. 2E and 2F, one of the two empty trays 12 that separated the first two planted trays 12 in bed B has been moved to bed C, leaving only one empty tray 12 to separate the first two planted trays 12 in bed A.

FIG. 2F shows the situation after four planted trays 12 have been moved out of bed C. The first tray 12 that was moved out of bed C has been moved to bed A. The second tray 12 that was moved out of bed C is being moved from bed B to bed A. The third and fourth trays 12 that were moved from bed C are in bed B. All four trays 12 that have been moved from bed C have been replaced in bed C by empty trays 12.

Figure 2G:
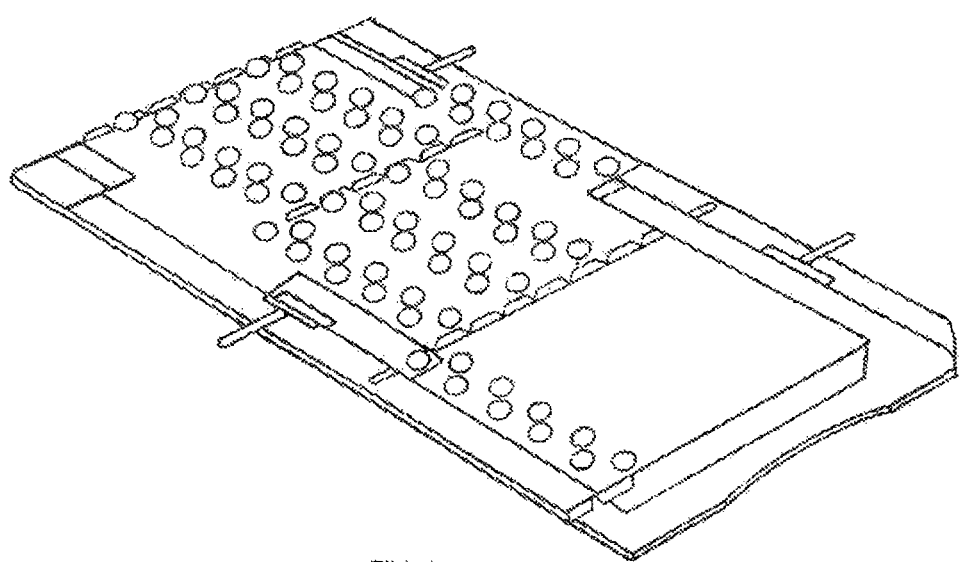

FIG. 2G shows the situation after all but one of the planted trays 12 have been moved from bed C to beds A and B. Beds A and B are being rotated to bring the fourth planted tray 12 from bed B to bed A.

Figure 2H:
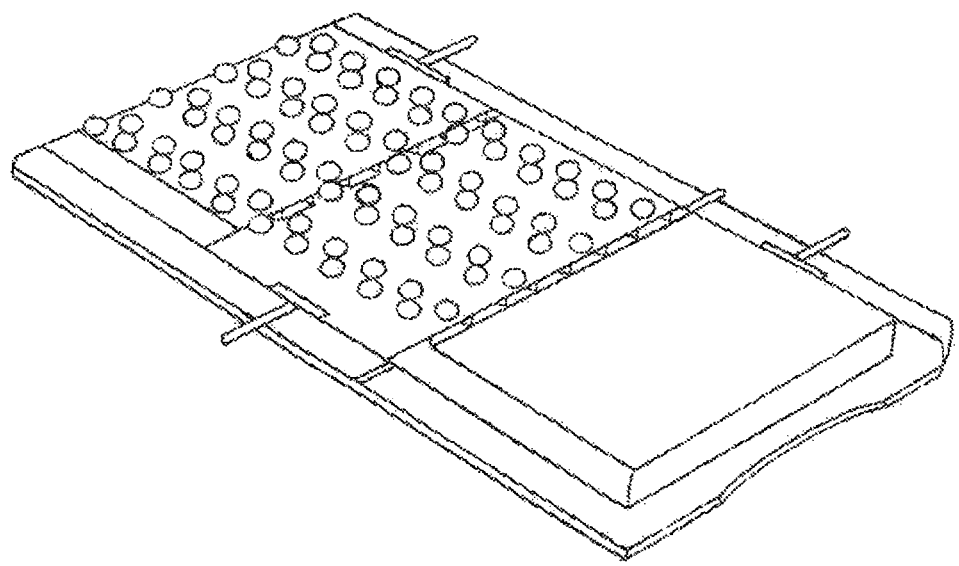

FIG. 2H shows the situation after all eight planted trays 12 have been moved from bed C to beds A and B. Each of beds A and B has four planted trays 12 separated by single empty trays 12.

Figure 2I:
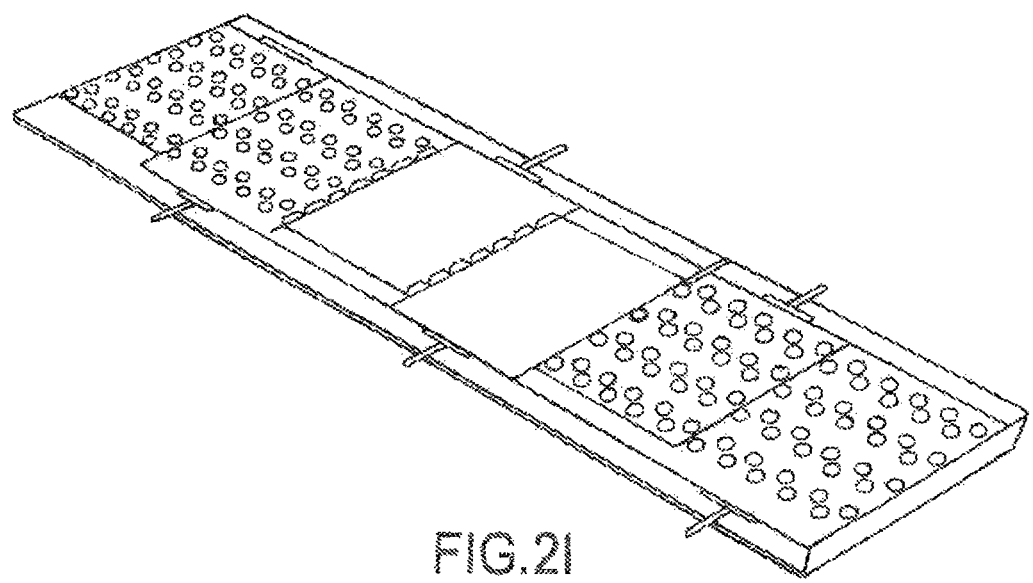
Figure 2J:
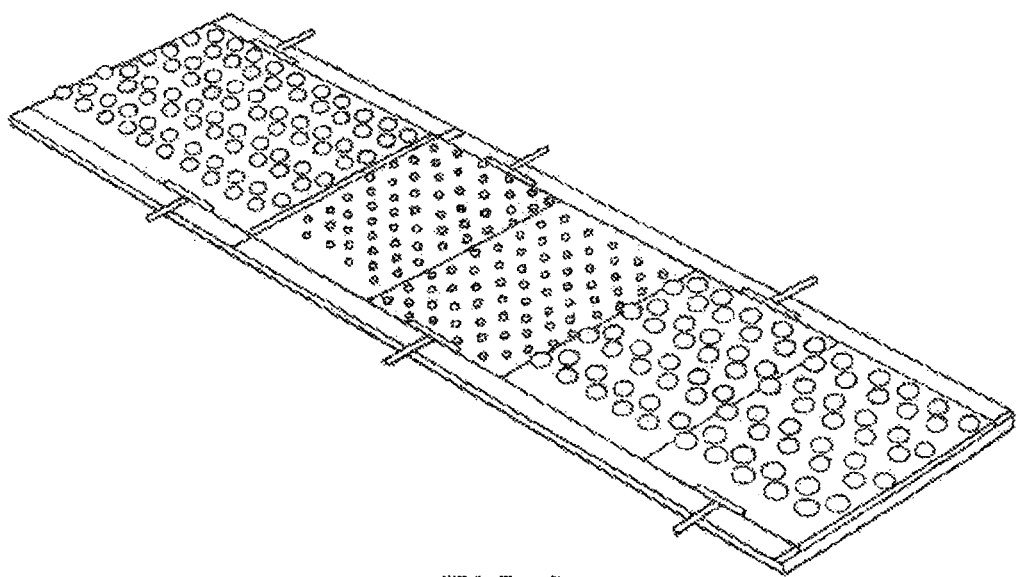

Meanwhile, as shown in FIG. 2I, similar operations have been performed on beds D, E and F. The empty trays 12 in beds C and D are ready to receive new plants. FIG. 2J shows beds C and D after replanting.

Figure 2K:
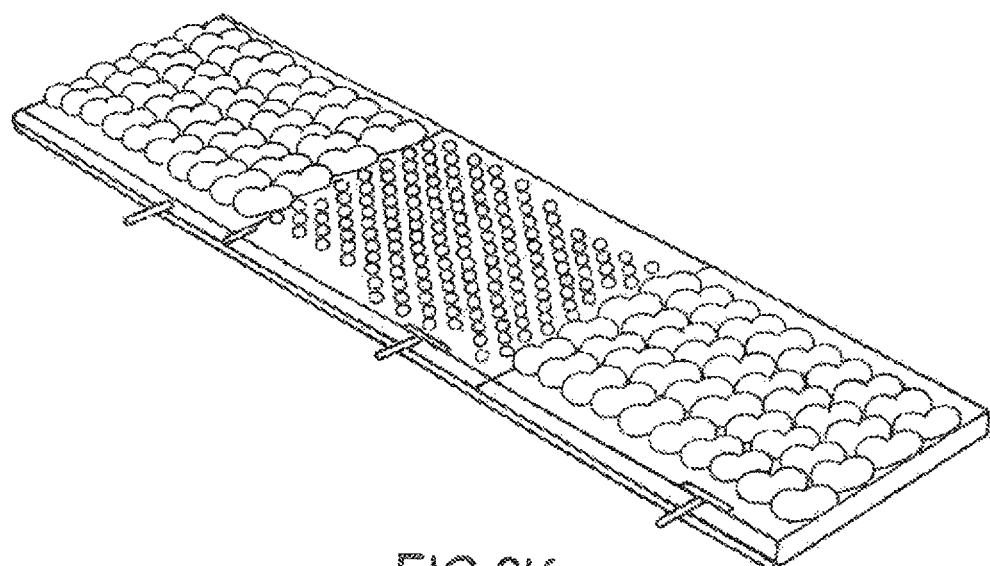

FIG. 2K shows the situation after continued growth in all six beds. The plants in beds A, B, E and F are ready for harvesting.

Figure 2L:
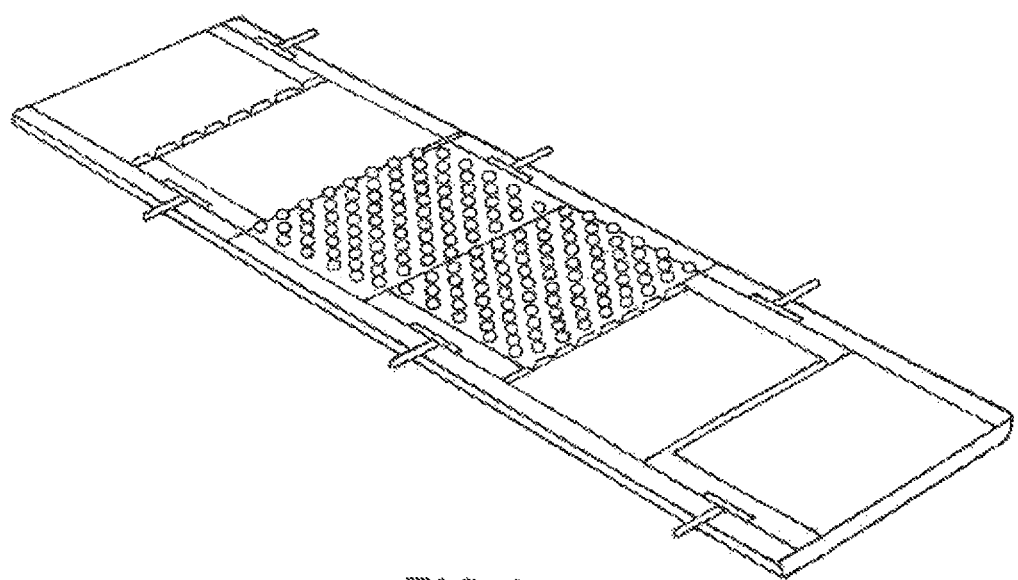

FIG. 2L shows the situation after the plants in beds A, B, E and F have been harvested. The plants in beds C and D have grown to the point of being ready to be moved to beds A, B, E and F for further growth.

Figure 2M:
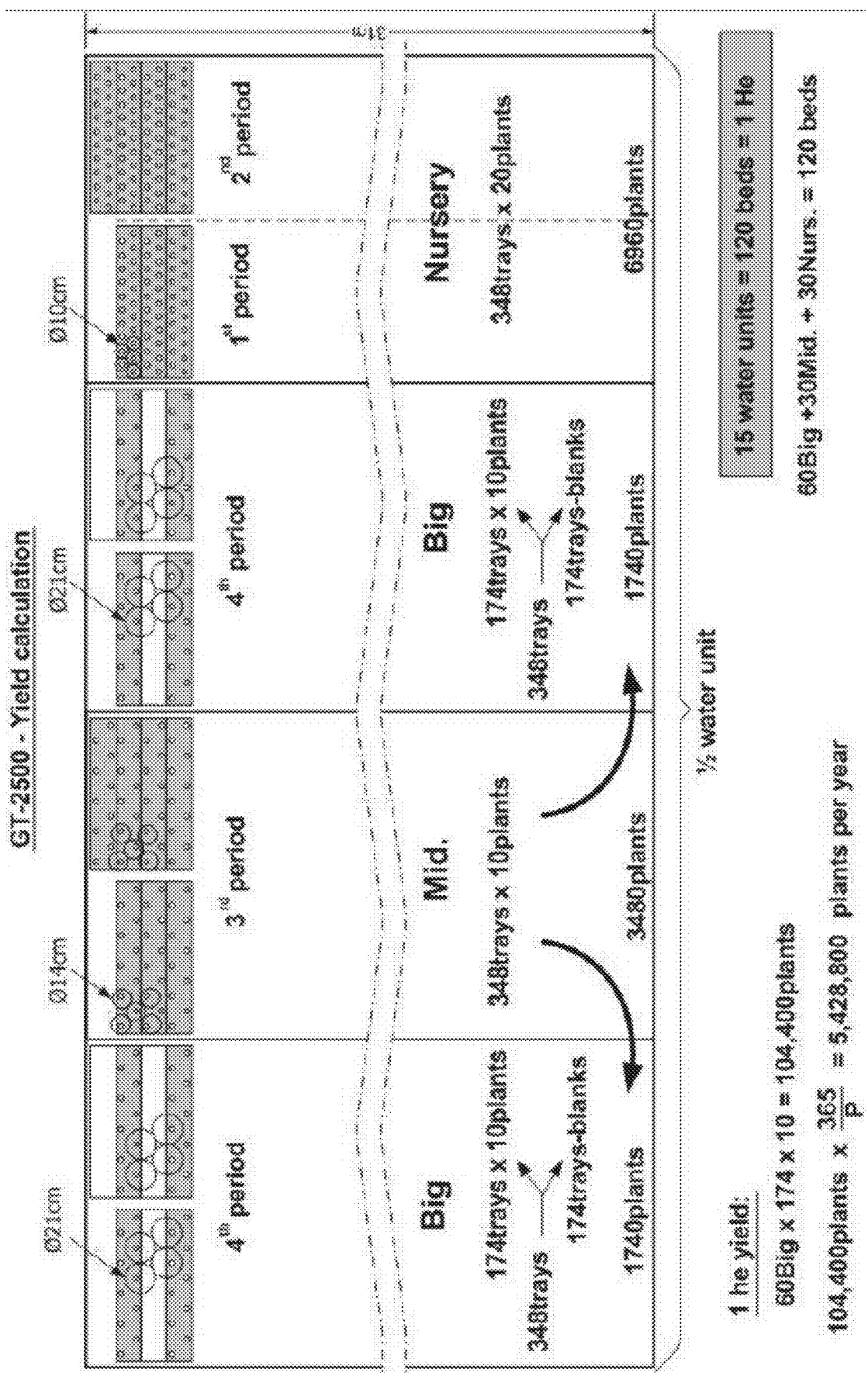
FIG. 2M shows that the six rows of FIGS. 2A-2L are six of the rows of an eight-bed water unit, with the other two rows being nursery rows.

FIG. 2M shows that water unit 14 of FIGS. 2A-2L actually includes eight beds, with the two leftmost beds being used as a nursery. FIG. 2M also presents a calculation of the expected yield of a greenhouse with fifteen such water units 14. FIG. 2M illustrates how the yield of a greenhouse of the present invention, per unit area, is increased by adapting the inter-plant spacing to the size of the plants, rather than using only the largest needed inter-plant spacing as is done conventionally.

Figure 3A:
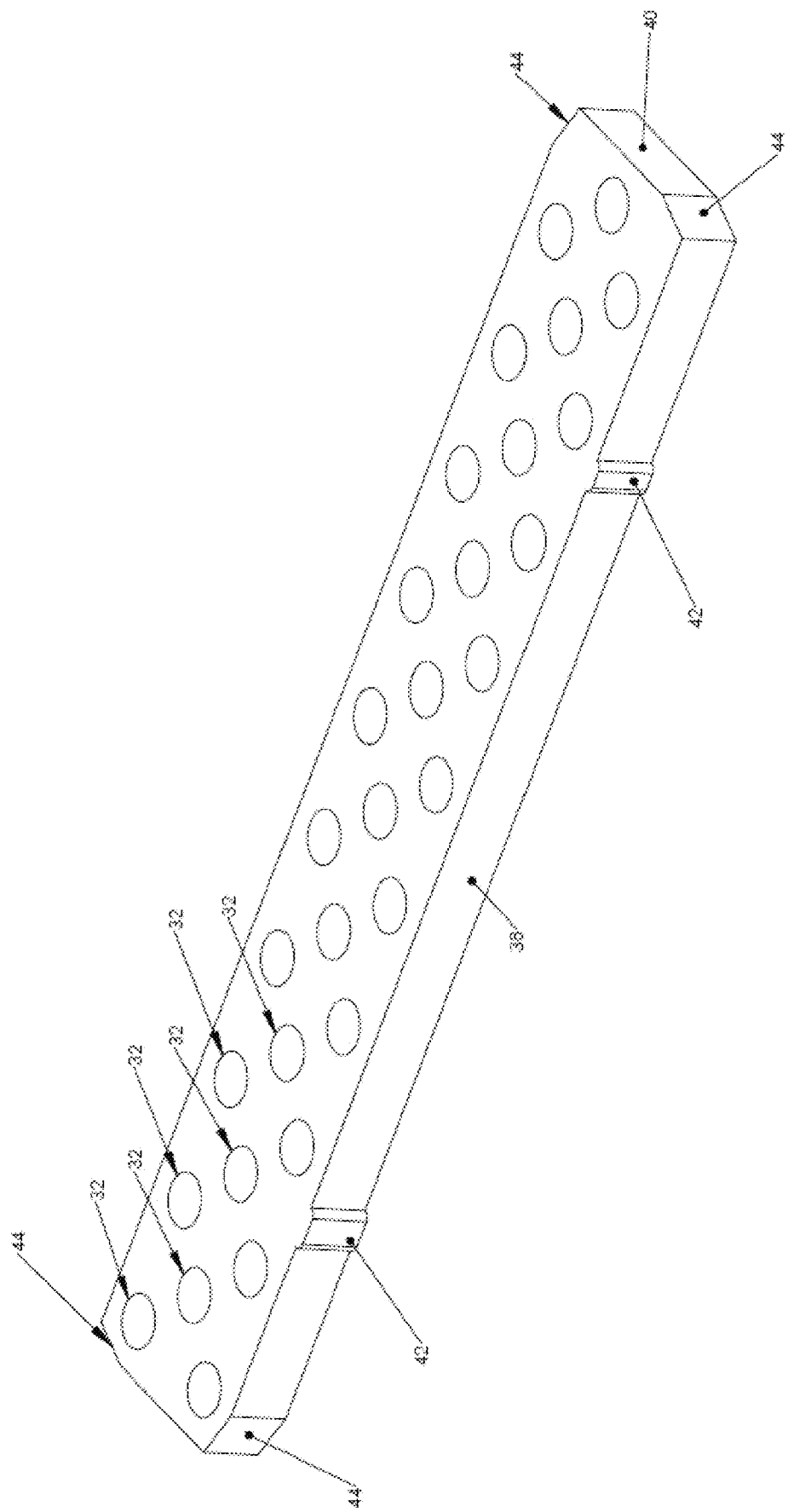
Figure 3B:
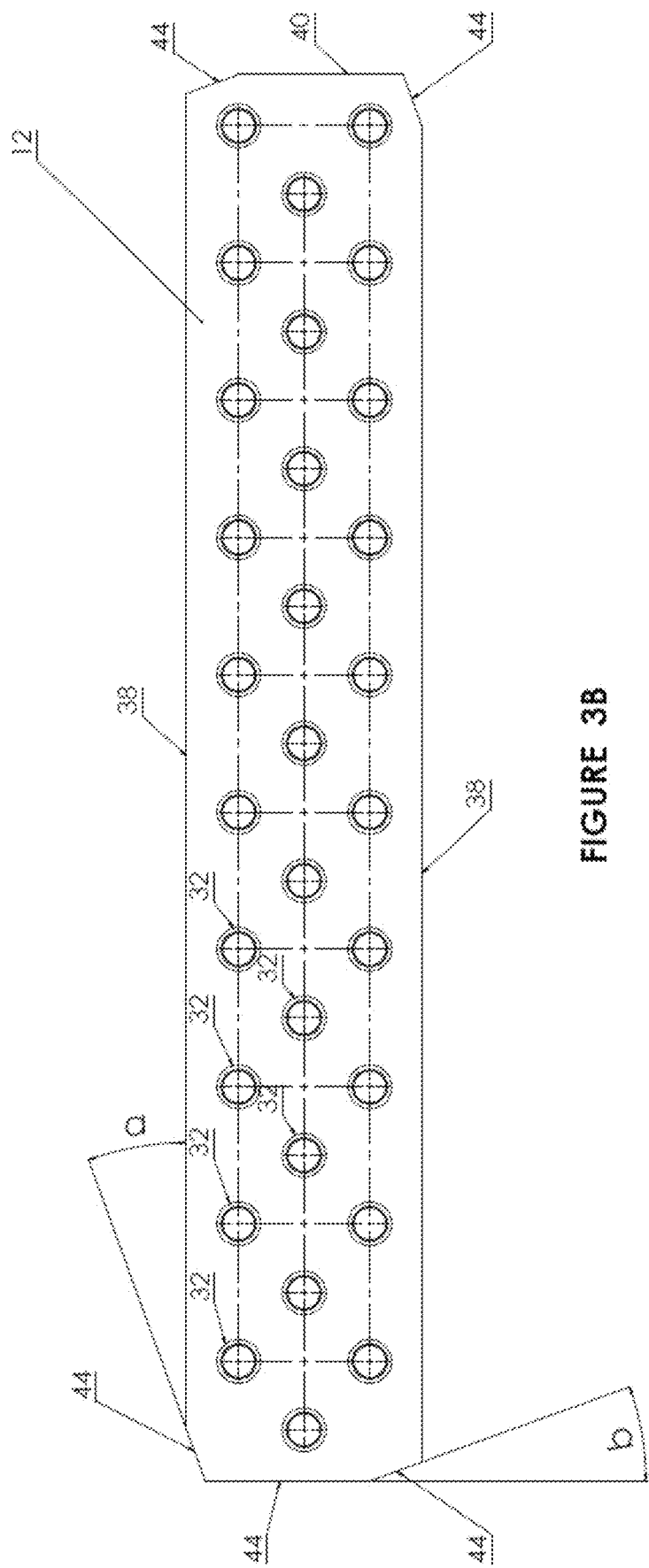

Trays 12 are made of a low-density polymer foam such as polystyrene foam. Trays 12 serve the following functions:
1. Provide support for the plants
2. Provide flotation for the plants
3. Enable the plants to be moved within and among the beds by pistons 20 and 26 as needed FIGS. 3A-3D illustrate preferred embodiments of a tray 12. FIG. 3A is a perspective view of one preferred embodiment of a tray 12. FIG. 3B is a top view of a similar preferred embodiment of tray 12. These embodiments are substantially parallelepipedal blocks of polystyrene foam with apertures 32, for holding plants, that extend from the top surface 34 of the block to the bottom surface (not shown) of the block. The long 38 and short 40 lateral sides of the block meet at champfers 44. FIGS. 3C and 3D are cross sectional views of two other preferred variants of a tray 12, showing two kinds of apertures 32 that extend from the top surfaces 34 of these trays 12 to the bottom surfaces 36 of these trays 12. Apertures 32 of the variant of FIG. 3C support their plants by the leaves of the plants. Apertures 32 of the variant of FIG. 3D supports the plants by their stems.

Figure 4:
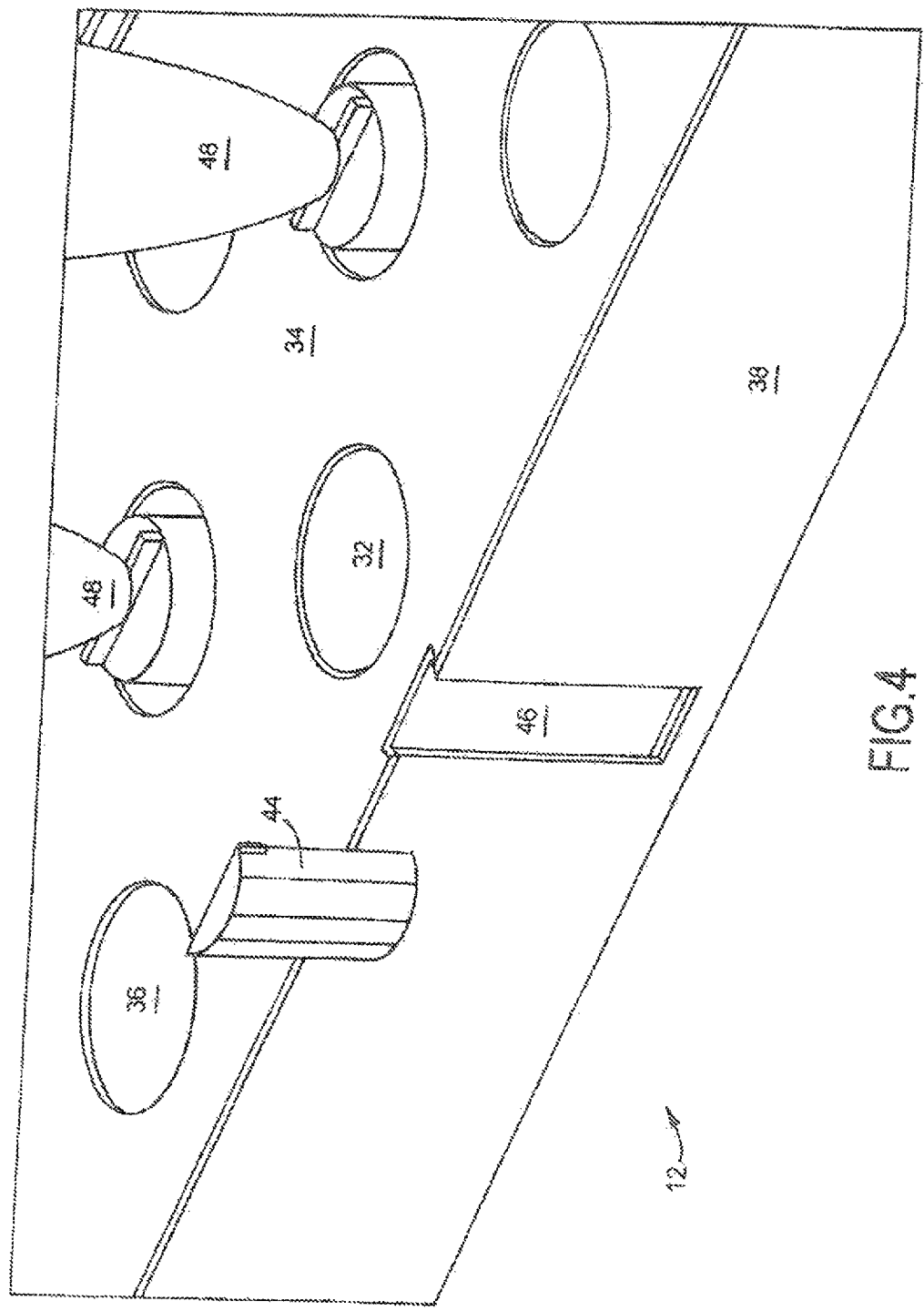
FIG. 4 shows one preferred embodiment of a protrusion of FIG. 3A.

Trays 12 float in the water-based nutrient solution 16 of the beds, with their long sides 38 parallel and adjacent. Absent lateral protrusions 42 from long sides 38 (shown in. FIG. 3A), the water would tend to form adhesive films on long sides 38 of trays 12 that would cause trays 12 to stick together and that would inhibit the tray rotation that is illustrated in FIGS. 2A-2L. Protrusions 42 space trays 12 apart, preferably ten centimeters apart, to prevent sticking. FIG. 4 shows one preferred embodiment of such a protrusion 42: a rigid insert, fabricated separately from tray, for insertion in a slot 46 in long side 38. (FIG. 4 also shows two apertures 32 occupied by respective plants 48.) To minimize friction and adhesion, protrusion 42 is smooth and/or is made of a low friction material such as Teflon™. Alternatively, trays 12 are fabricated with integral protrusions 42. Although integral protrusions 42 are made of the same material as these trays 12, trays 12 with protrusions 42 have much lower areas of mutual contact than trays 12 with smooth sides 38 and so do not stick together appreciably.

The edges of trays 12 where lateral sides 38 and 40 meet are champfered because the motion of pistons 20 and 26 may deviate from exact rectilinear motion by up to about 5 degrees. Champfers 44 also help to keep trays 12 from sticking together. The champfer angles a and b shown in FIG. 3B preferably are between 15° and 25°.

Depending on how apertures 32 in trays 12 are shaped and sized, and on the nature of the plants, the plants can be supported either from their bottom or from their sides.

Hybrid Hydroponics

The hydroponic technology of the present invention is a hybrid of Deep Water Culture (DWC) and Nutrient Film Technique (NFT)

Deep Water Culture (DWC)—also referred to in the prior art as "floating raft hydroponics"—uses deep water bed typically on the order of one foot deep, containing all the dissolved nutrients required for plant growth. This nutrient solution is re-circulated past the bare roots of the plants. This technique has high productions costs and has problems with root disease due to lack of sufficient dissolved oxygen.

Nutrient Film Technique (NFT) is a hydroponics technique that uses a film of a thin stream of water, containing all the dissolved nutrients required for plant growth, that is re-circulated past the bare roots of plants in a trough, gutter or gulley, also referred to in prior art as a channel. Plants roots grown in this system have the same temperature and temperature changes as the ambient temperature. This situation is unnatural and unhealthy for the plant (the temperature of the soil that surrounds a naturally grown plant is much more stable than the temperature of the air above the soil) and can lead to poor performance depending on the variability of the ambient temperature.

The hydroponic system and technique of the present invention is a hybrid of DWC and NFT that combines the all the benefits of DWC and NFT while eliminating almost all the problems. The system of the present invention uses water beds that are deep enough (4 to 20 cm; preferably 5-6 cm) to enable temperature regulation and stability of nutrient solution 16 but not so deep as to prevent the supply of sufficient dissolved oxygen in nutrient solution 16.

Figure 5:
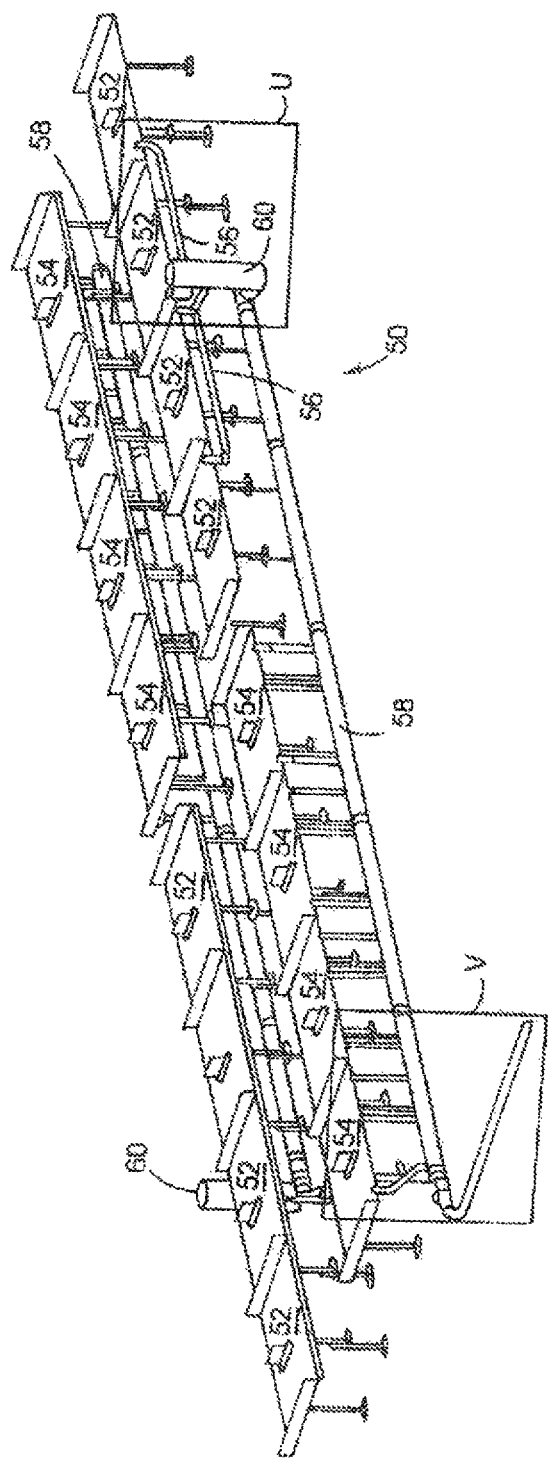
FIG. 5 shows a nutrient solution circulation system for the eight-bed water unit of FIG. 2M.

Nutrient solution 16 is circulated on a per-unit basis. The beds are oriented north-south (so the long direction of trays 12, the "X-direction" of FIG. 1A, is east-west and the "Y-direction" of FIG. 1A is north-south) and nutrient solution 16 circulates one way (e.g. north to south) in odd-numbered beds and the other way (e.g. south to north) in even-numbered beds. The pumping system used is airlift pumping. Airlift pumping is used routinely in aquaculture but has not been used heretofore in hydroponics. FIG. 5 illustrates the airlift pumping system of the present invention.

FIG. 5 shows a nutrient solution circulation system 50 for two adjacent beds of the eight-bed water unit of FIG. 2M. At the bases of the southern half of the western bed and at the bases of the northern half of the eastern bed are respective inlet tables 52. At the bases of the southern half of the eastern bed and at the bases of the northern half of western bed are respective outlet tables 54. Conventional airlift pumps 60 pump nutrient solution 16 to inlet tables 52 via inlet pipes 56. Nutrient solution 16 returns to airlift pumps 60 from outlet tables 54 via outlet pipes 58. The overall circulation of nutrient solution 16 is east to west in the northern halves of the two beds, north to south within the western bed, west to east in the southern halves of the two beds, and south to north within the eastern bed.

The airlift pumping must be performed at a sufficiently high flow rate to achieve at least 80% $O_2$ saturation of nutrient solution 16. Merely bubbling air through water does not achieve this degree of saturation because the high surface tension of the bubble surface inhibits dissolution of the air in the water. It is believed that microturbulence at the bases of trays 12, especially at the openings of apertures 32, causes bursting of the bubbles and consequent efficient solution of oxygen in nutrient solution 16. The cross section of the flowing nutrient solution 16 is about 1 m wide (the width of a tray 12).times.5 cm deep and the flow rate through this cross section is about 6 to 8 cubic meters per hour.

Figure 6:
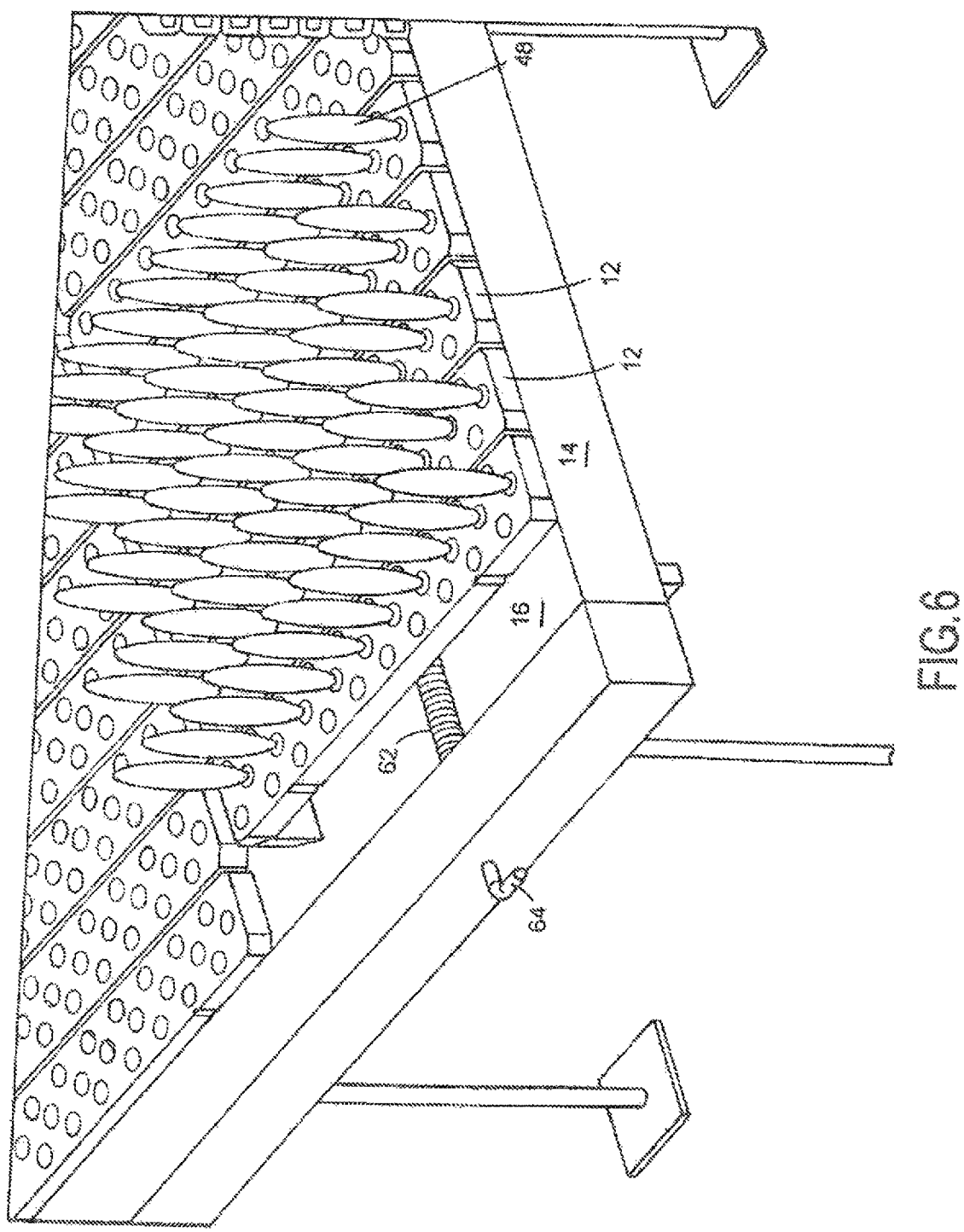
FIGS. 6 and 7 illustrate hardware for nutrient solution temperature regulation.
Figure 7:
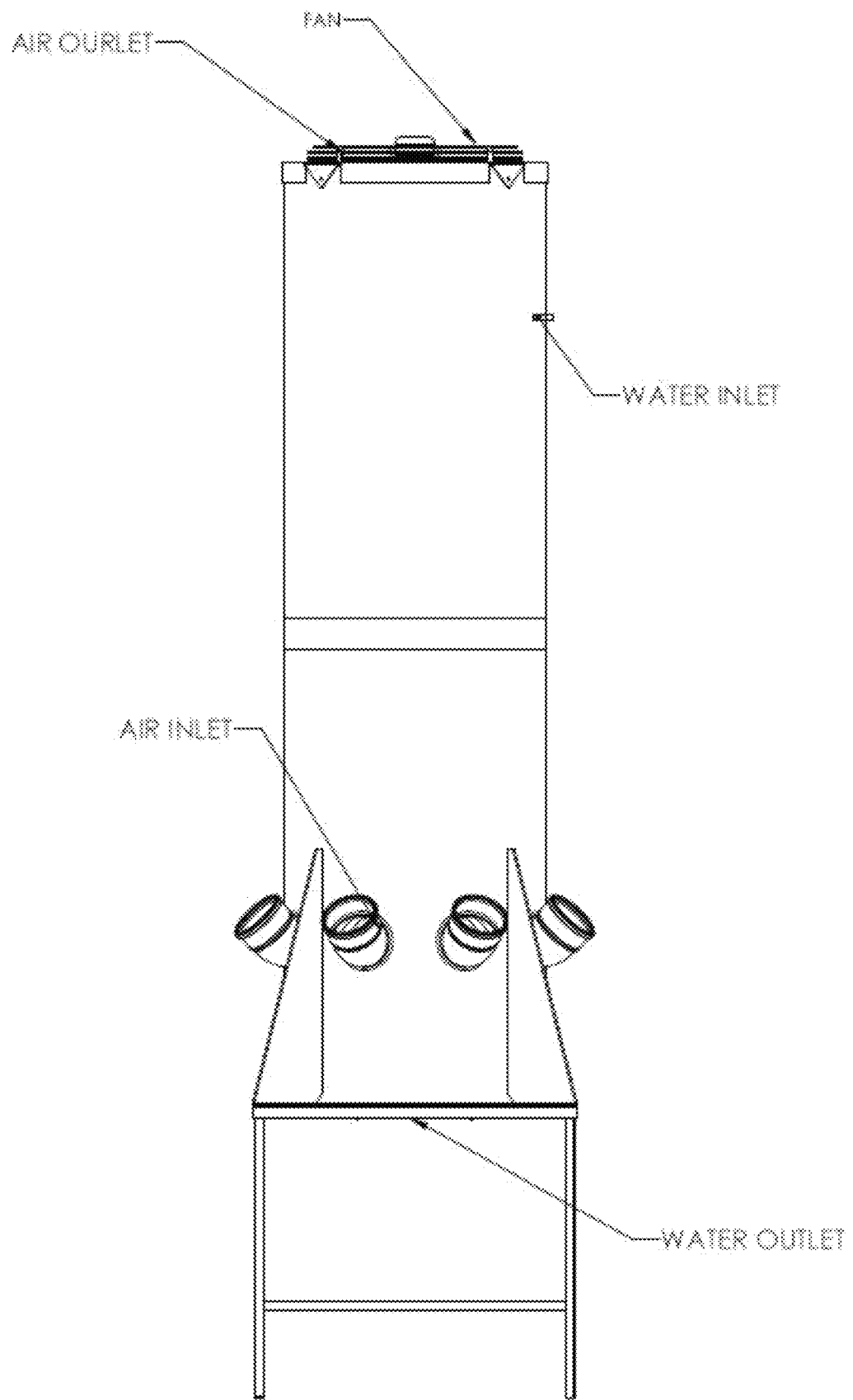

FIGS. 6 and 7 illustrate some of the hardware that is used for regulating the temperature of the nutrient solution of a bed. FIG. 6 shows a bed 14 whose nutrient solution 16 is heated by a hot water radiator 62 that receives hot water via a hot water inlet 64. FIG. 7 shows a cooling tower that is used to cool nutrient solution 16 of a unit. Air is blown upward past a downward spray of nutrient solution 16. Because nutrient solution 16 is corrosive, the inside surfaces of the tower that come in contact with nutrient solution 16 are coated with a liner made of a polymer such as polyethylene.

Figure 8:
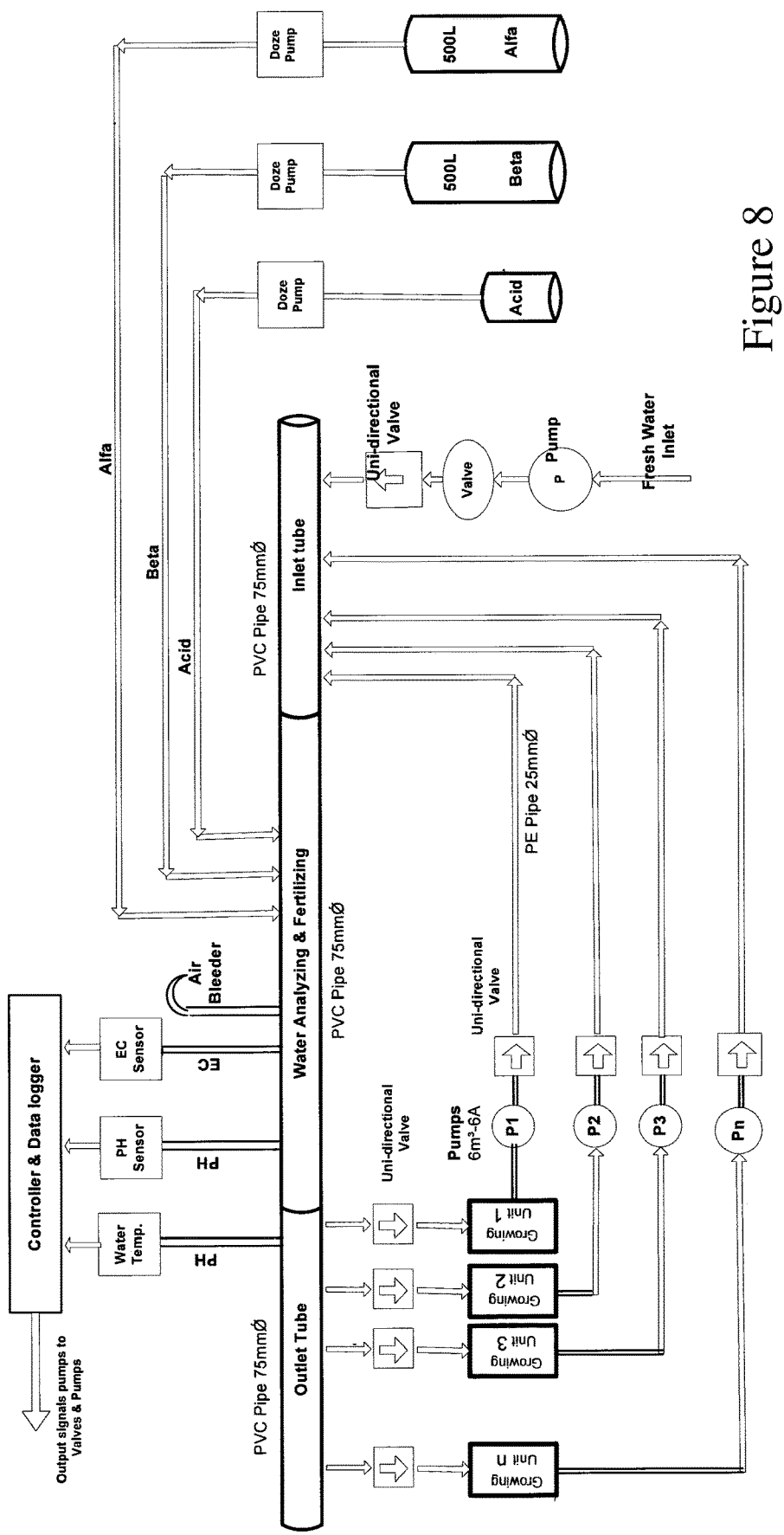
FIG. 8 illustrates a monitoring and control system of a multi-unit rotating field system.

The dissolved oxygen content, the electrical conductivity and the pH of nutrient solution 16 also are monitored and controlled, on a per unit basis. A monitoring and control system 70 of a multi-unit system is illustrated in FIG. 8. A central controller and data logger 72 samples nutrient solution 16 of each unit separately via a respective bypass pipe 74. Missing water and nutrients, and acid for adjusting pH, are injected to the unit as needed. (In FIG. 8, "Alfa" and "Beta" are concentrated nutrient solutions, and the "Air Bleeder" is used for monitoring and controlling dissolved oxygen content.) Controller 72 also synchronizes the movement of pistons 20 and 26.

Conventionally, each hydroponic water unit has been controlled by its own controller. In the multi-unit system of the present invention, as illustrated in FIG. 8, the redundancy of having separate sensors, separate pumps and a separate controller for each unit is eliminated by providing a central controller 72 and an associated manifold 76 from which respective bypass pipes 74 branch out to the various units. Each bypass pipe 74 is provided with a pump (pumps P1 through Pn in FIG. 8) that is controlled by central controller 72. To monitor the condition of a unit, central controller 72 opens the valve 78 associated with that unit to obtain a sample of the unit's nutrient solution 16.

Figure 9A:
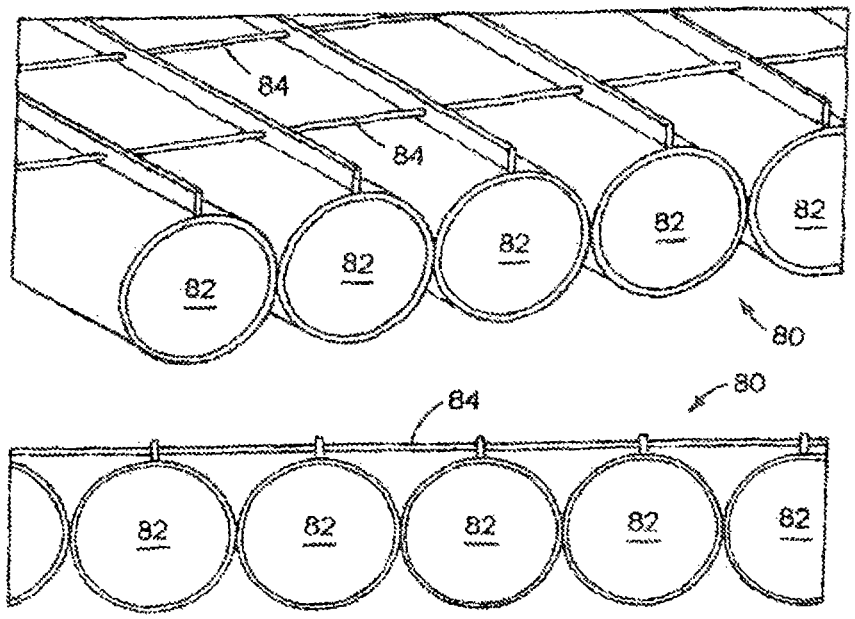
FIGS. 9A and 9B illustrate an array of inflatable tubes for shading a bed of a rotating field system.
Figure 9B:
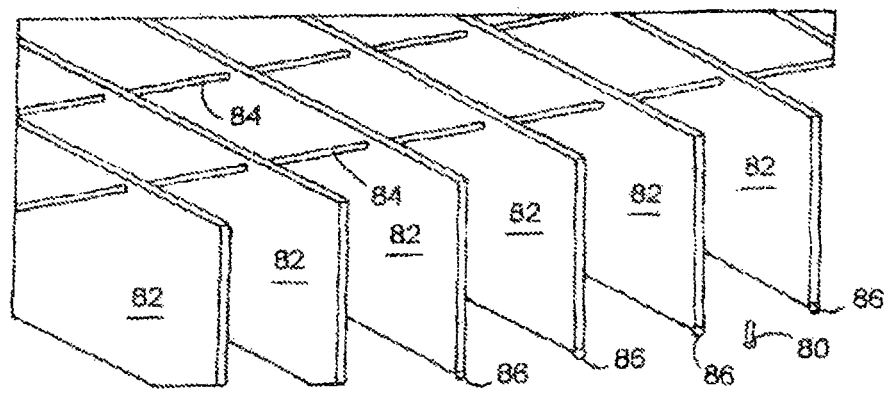
Figure 9B:
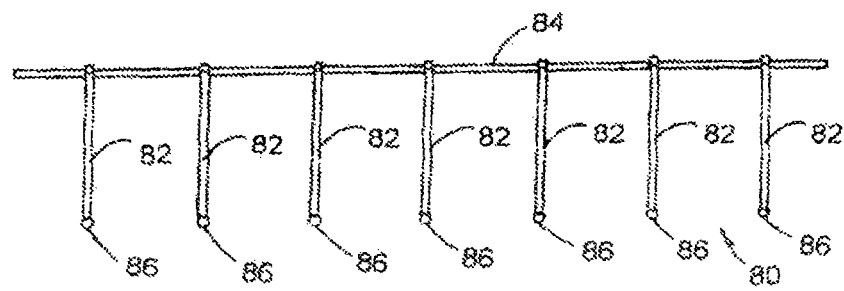

Natural ambient lighting (sunlight) is used to grow the plants. The system is housed in a transparent or semitransparent building such as a greenhouse or a screen house. Above beds 14 of each unit is an array 80 of east-west oriented flexible inflatable tubes 82 that are illustrated in perspective view and in cross-section in FIGS. 9A and 9B. FIG. 9A shows tubes 82 as fully inflated. FIG. 9B shows tubes 82 as deflated. Support wires 84 suspend tubes 82 above beds 14. Weight wires 86 pull deflated tubes 82 vertically flat, as shown in FIG. 9B. Tubes 82 are inflated by air to the degree needed for thermal screening (e.g. at night) and illumination control. Additional illumination control is obtained by using a colloidal suspension of particles such as smoke particles in the air that is used to inflate the tubes. The higher the density of the colloidal particles, the lower the level of illumination. Colored particles are used to control the spectrum of the light that illuminates the plants. For example, green light, that is not used in photosynthesis and may contribute to excessive heating of the greenhouse, may be filtered out.

Alternatively, a system of tilting shutters is used. The shutters are closed at night and are opened in the daytime at a tilt that changes with the angle at which the sun is shining.

Figure 10:
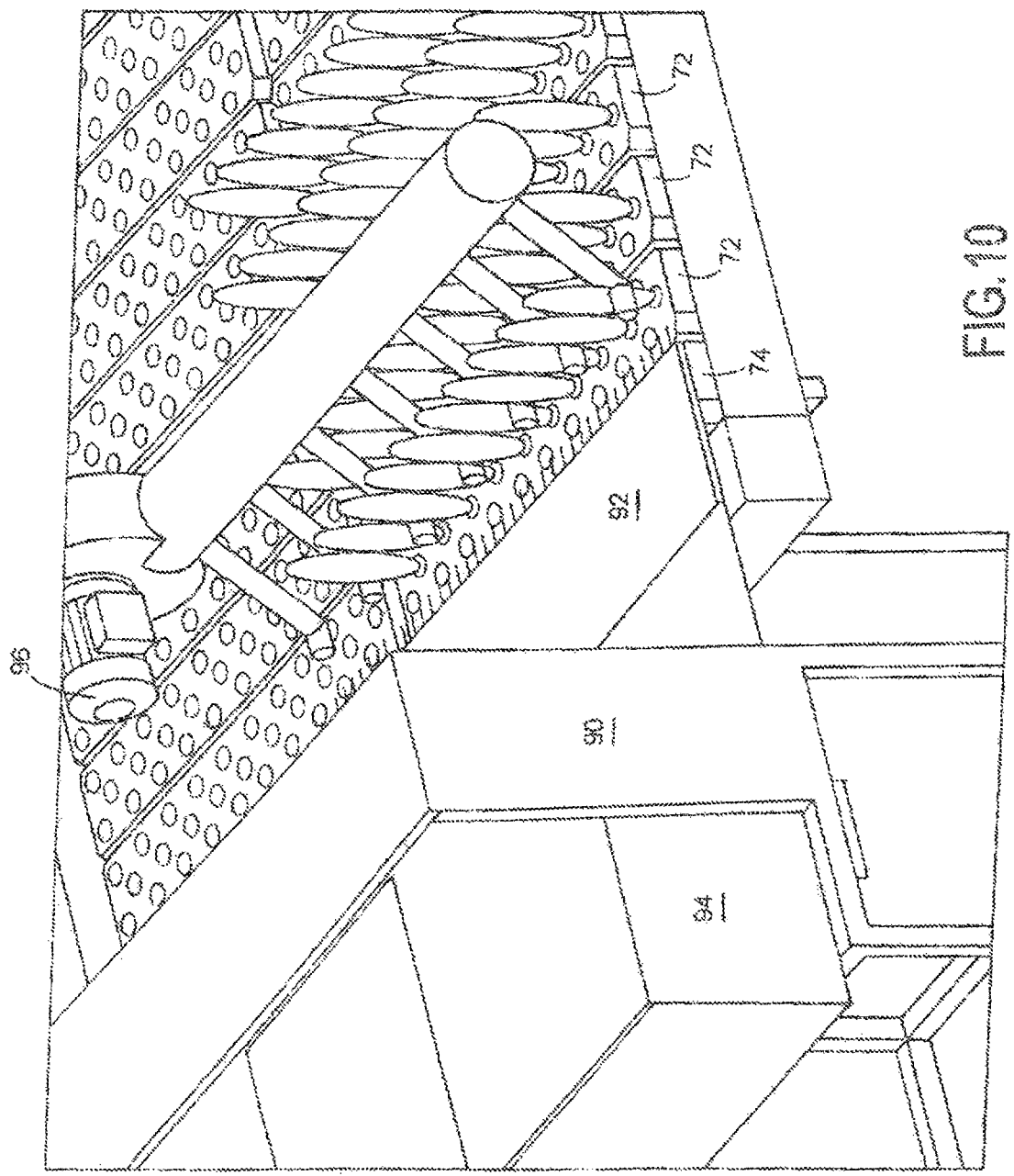
FIG. 10 shows a harvesting machine that is usable with the rotating field system or with the nutrient film technique system.

Planting and harvesting are done either manually or automatically. One method of automatic planting and harvesting is robotic, as described in U.S. Pat. No. 6,508,033, which patent is incorporated by reference for all purposes as if fully set forth herein. Another method of automatic harvesting is as follows:

FIG. 10 shows a harvesting machine 90 that is usable with the rotating field system and method described above or with an automated NFT bed system as described below to automatically harvest leafy vegetables and other plants to be packed in bulk. Machine 90 has a set of knives 92 and a set of transport mechanisms which extend on a transverse frame. The frame is mountable on or near the rotating field system units or near the automated NFT bed system. The rotating field system or the automated NFT bed system is used to bring the harvested crop to machine 90 for harvesting. Knives 92 are operated by an electric motor. An electric air blower 96 and a conveyer can be the transport mechanisms used to move the cut leaves or plants into a collecting container 94.

Harvesting machine 90 is displaceable on or near a hydroponics growing bed 14. Harvesting machine 90 includes a frame, having working mechanisms and a structure supporting the working mechanisms. The frame further has a set of mounts and a set of placement calibrating mechanisms extending at least approximately parallel to the growing bed plane, permitting a modification of the vertical position of the frame; a set of knives 92 powered by an electric motor for cutting the crop; connected to the structure by means that allow a modification of the vertical position of knives 92, two spaced apart first wheels extending when considering the working direction behind the working tools allowing a modification of the vertical position of the first wheels in relation to the body, the first wheels being in contact with the ground or the sides of the bed or a rail set on the ground or connected to the bed during working in order to support the body during working.

Plants that can be grown in the system of the present invention include: lettuce cos romaine, lettuce iceberg, lettuce lollorosa, lettuce butterhead, lettuce (curly leaf vars.), Chinese leaves (Chinese cabbage), chives, arugula, rocket, spring onions, pac-choy, mint leaves, dill, coriander, sweet basil, opal basil, rosemary, sage, tarragon, parsley (curly), parsley (flat), lemon grass and spinach.

Improved NFT Bed System

Most conventional NFT systems use individually fabricated troughs or gutters, usually formed from extruded plastic, and tilted at an angle of 3° to 5° to allow the nutrient solution to flow past plants that are planted in a growth medium such as peat moss within the gutters.

The NFT system of the current invention makes use of a corrugated metal sheet to create gutter-shaped troughs in a more cost-efficient way. The sheet is coated with a polymeric material to prevent corrosion by the nutrient solution.

Figure 11:
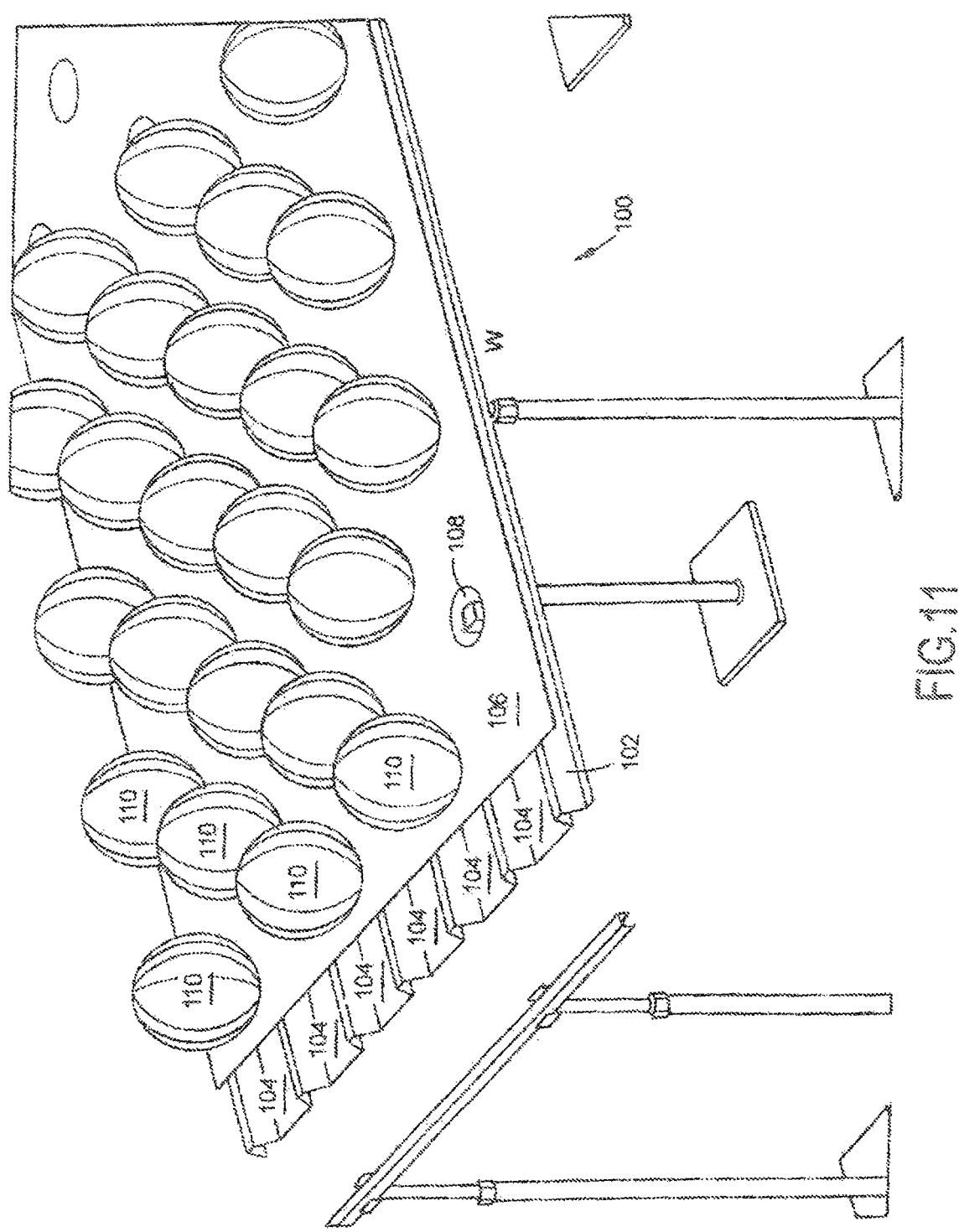
FIGS. 11 and 12 illustrates the nutrient film technique system of the present invention.

FIG. 11 shows an NFT system of the present invention: a gently (3° to 5° tilted, polymer-coated corrugated metal sheet 102 above which is rolled out an opaque plastic sheet 106 with apertures 108. That sheet 106 is opaque prevents light from striking the water-nutrient film in the troughs 104 of sheet 106 and promoting the growth of algae. Plants 110 are planted in/through apertures 108.

Figure 12:
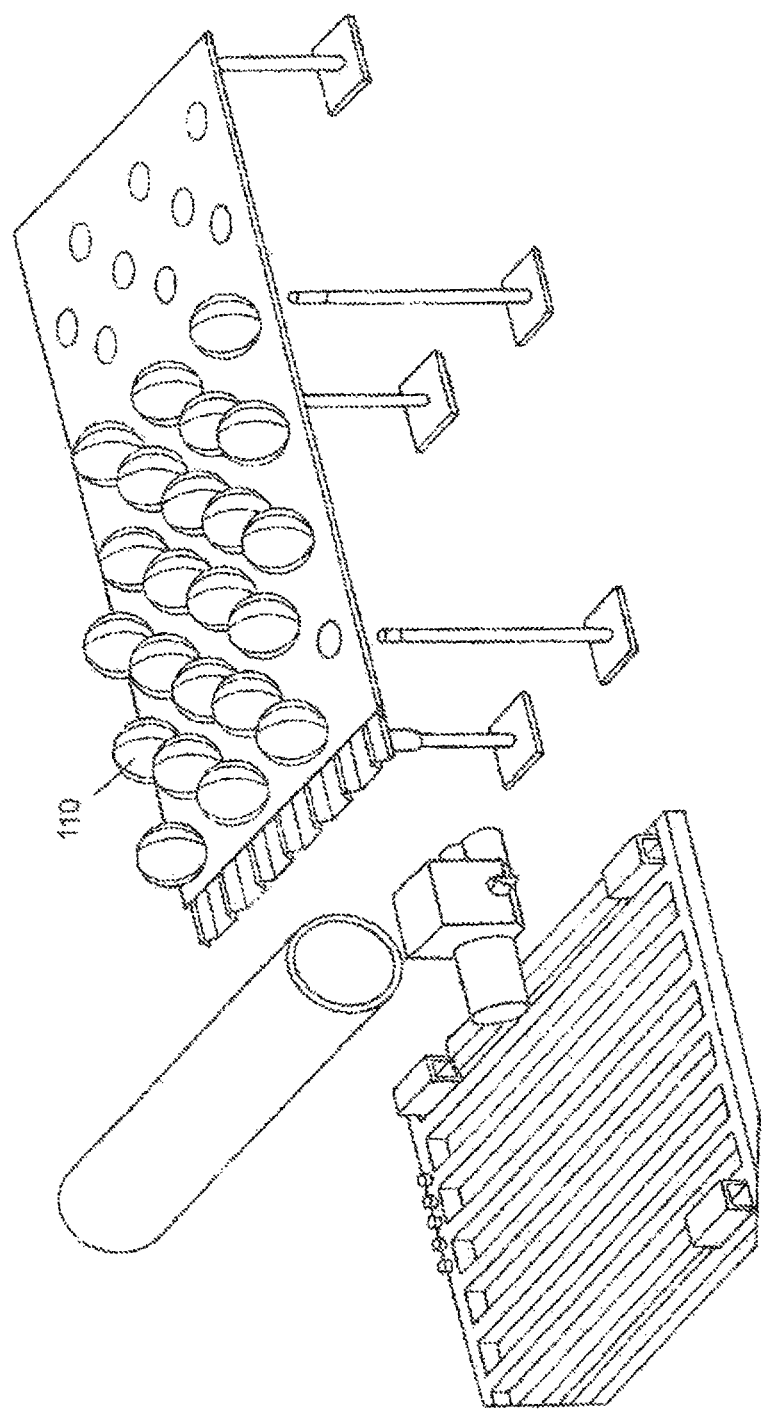

FIG. 12 shows that sheet 106 is rolled out from a roller 112. For harvesting, sheet 106 is rolled back onto roller 112 and plants 110 are harvested as they approach roller 112. Then sheet 106 is rolled back out and replanted.

Rolling out sheet 106 for planting and rolling sheet 106 back for harvesting allows the workers to stand at or behind the roller to do the planting and the harvesting. With no need for aisles for the workers to walk along past sheet 106, the NFT system of the present invention economizes on both the cost of labor and the cost of real estate.

FIG. 12 shows sheet 106 rolled out from the bottom of roller 112. In an alternative configuration, sheet 106 is rolled out from the top of roller 112. In this alternative configuration, harvesting machine 90 can be moved up to the side of roller 112 opposite sheet 102, to harvest plants 110 as plants 110 come in over the top of roller 112.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A rotating field system apparatus for growing plants comprising:
   a pool for holding a nutrient solution;
   a plurality of trays configured for floating in the nutrient solution of the pool and holding plants such that the roots of the plants are at least partially immersed in the nutrient solution of the pool, each tray of the plurality of trays being substantially similar to each other in construction and dimensions, and the plurality of trays arranged in a plurality of rows in the pool, and the trays of a sufficient number, that for each row, there is a vacant gap of sufficient dimensions to receive at least one tray from an adjacent said row;
   for each said row of the plurality of rows, at least one first mechanism for moving said at least one tray of said each row within said each row, thereby changing a location of said gap within said row relative to said at least one tray of said row;
   at least one second mechanism for moving one of said at least one tray of said each row into said gap of an adjacent said row; and,
   a controller for controlling each said at least one first mechanism and each said at least one second mechanism to move said trays in said plurality of rows, such that the trays move in at least two rotations;
   wherein the plurality of rows includes a center row between oppositely disposed lateral rows, and said at least one second mechanism includes at least one second mechanism along each of the lateral rows, and, the controller for additionally controlling each said at least one first mechanism and each said at least one second mechanism such that at least one tray is moved into the center row from each lateral row.

2. The apparatus of claim 1, wherein the pool is substantially rectangular in shape with oppositely disposed first sides defining the length of the pool, and oppositely disposed second sides defining the width of the pool, the first and second sides adjacent to each other.

3. The apparatus of claim 2, wherein each of the trays include apertures extending from the top surface of the tray to the bottom surface of the tray, the apertures configured for: 1) supporting plants by at least one of the leaves of the plant or the roots of the plant; and 2) creating microturbulant areas of the nutrient solution in the pool.

4. The apparatus of claim 3, wherein the trays are identical to each other.

5. The apparatus of claim 3, wherein the at least one first mechanism and the at least one second mechanism include pistons, the pistons arranged such that for each row of the trays, there is one piston positioned along one of the first sides, with pistons for adjacent rows of the trays disposed along the opposite first side, and, at least one pair of pistons, one piston of the at least one pair of pistons disposed diagonally along each one of the second sides, the diagonal disposition dependent upon the direction of the rotation for the trays, the pistons for automatically rotating the floating trays.

6. The apparatus of claim 1, additionally comprising: a mechanical harvester in communication with a predetermined location of the pool.

7. The apparatus of claim 3, additionally comprising: an airlift pump in communication with the pool, the airlift pump configured for supplying oxygen for the nutrient solution to the microturbulant areas of nutrient solution for causing oxygen saturation of the nutrient solution.

8. The apparatus of claim 1, additionally comprising: at least one manifold in communication with the pool for sampling nutrient solutions held in the pool.

9. The apparatus of claim 8, wherein the controller is in communication with the manifold and each pool, the controller configured for measuring properties of the sample obtained via the manifold, and adjusting the nutrient solution in the pool in response to the measured properties of the obtained sample.

10. The apparatus of claim 1, additionally comprising a temperature control unit in communication with the pool for controlling the temperature of the nutrient solution in the pool.

11. The apparatus of claim 1, wherein the vacant gap includes dimensions corresponding to the dimensions of one tray of the plurality of trays.

12. The apparatus of claim 1, wherein the controller additionally controls each said at least one first mechanism and each said at least one second mechanism such that at least one tray is moved into the center row from each lateral row in an alternating manner.

13. A rotating field system apparatus for growing plants comprising:
   a pool for holding a nutrient solution, the pool including oppositely disposed first sides and oppositely disposed second sides;
   a plurality of trays configured for floating in the nutrient solution of the pool and holding plants such that the roots of the plants are at least partially immersed in the nutrient solution of the pool, each tray of the plurality of trays being substantially similar to each other in construction and dimensions, and the plurality of trays arranged in a plurality of rows in the pool, and the trays of a sufficient number, that for each row, there is a vacant gap of sufficient dimensions to receive at least one tray from an adjacent said row, each of the trays including apertures extending from the top surface of the tray to the bottom surface of the tray, the apertures configured for: 1) supporting plants by at least one of the leaves of the plant or the roots of the plant; and 2) creating microturbulant areas of the nutrient solution in the pool;
   for each said row, at least one first mechanism for moving said at least one tray of said each row within said each row, thereby changing a location of said gap within said row relative to said at least one tray of said row;
   at least one second mechanism for moving one of said at least one tray of said each row into said gap of an adjacent said row;
   the at least one first mechanism and the at least one second mechanism including pistons, the pistons arranged such that for each row of the trays, there is one piston positioned along one of the first sides, with pistons for adjacent rows of the trays disposed along the opposite first side, and, at least one pair of pistons, with one piston of the at least one pair of pistons disposed diagonally along each one of the second sides, the diagonal disposition dependent upon the direction of the rotation for the trays, the pistons for automatically rotating the trays when the trays are floating in the nutrient solution in the pool; and,
   a controller for controlling each said at least one first mechanism and each said at least one second mechanism to move said trays in said plurality of rows, such that the trays move in at least two rotations.

\* \* \* \* \*